US011454866B2

(12) United States Patent
Artus et al.

(10) Patent No.: US 11,454,866 B2
(45) Date of Patent: Sep. 27, 2022

(54) ELECTRONIC RANGEFINDER

(71) Applicant: PIXII SAS, Besançon (FR)

(72) Inventors: Melric Artus, Besançon (FR); David Barth, Besançon (FR)

(73) Assignee: PIXII SAS, Besançon (FR)

( * ) Notice: Subject to any disclaimer, the term of this patent is extended or adjusted under 35 U.S.C. 154(b) by 0 days.

(21) Appl. No.: 17/242,176

(22) Filed: Apr. 27, 2021

(65) Prior Publication Data

US 2021/0333688 A1    Oct. 28, 2021

Related U.S. Application Data

(60) Provisional application No. 63/016,082, filed on Apr. 27, 2020.

(51) Int. Cl.
*G03B 13/20* (2021.01)
*G03B 17/20* (2021.01)
*H04N 5/232* (2006.01)

(52) U.S. Cl.
CPC ............. *G03B 13/20* (2013.01); *G03B 17/20* (2013.01); *H04N 5/23212* (2013.01)

(58) Field of Classification Search
CPC ..... G03B 13/20; G03B 17/20; H04N 5/23212
See application file for complete search history.

(56) References Cited

U.S. PATENT DOCUMENTS

| | | | |
|---|---|---|---|
| 4,100,556 A | | 7/1978 | Blinow |
| 4,303,323 A | * | 12/1981 | Imai ........................ G03B 13/20 396/141 |
| 2015/0138409 A1 | * | 5/2015 | Misawa ................. G03B 13/06 348/294 |
| 2016/0100085 A1 | * | 4/2016 | Denk ................... H04N 5/2258 348/139 |

FOREIGN PATENT DOCUMENTS

| | | |
|---|---|---|
| DE | 2740929 A1 | 3/1979 |
| GB | 1405295 A | 9/1975 |
| JP | H07333492 A | 12/1995 |
| JP | 2013088559 A * | 5/2013 |

OTHER PUBLICATIONS

International Patent Application No. PCT/IB2021/000275, International Search Report and Written Opinion dated Aug. 10, 2021, 14 pages.

* cited by examiner

*Primary Examiner* — Clayton E. LaBalle
*Assistant Examiner* — Diana Hancock

(57) ABSTRACT

Systems and methods directed to a digital rangefinder camera are described. The digital rangefinder camera may include a viewfinder assembly configured to receive a first optical image from a first optical path and a focus ring movement detection assembly configured to detect an amount of movement associated with a focus ring of a lens attached to the digital rangefinder camera. A processing device may be configured to provide a movement signal indicative of the amount of movement associated with the focus ring to an actuator coupled to an optical element, where the actuator moves the optical element and displaces a second optical image from a second optical path directed toward an optical component in the viewfinder assembly. The optical component in the viewfinder assembly is configured to project the first optical image and the second optical image toward a single common viewing position when the first optical image and the second optical image coincide.

20 Claims, 17 Drawing Sheets

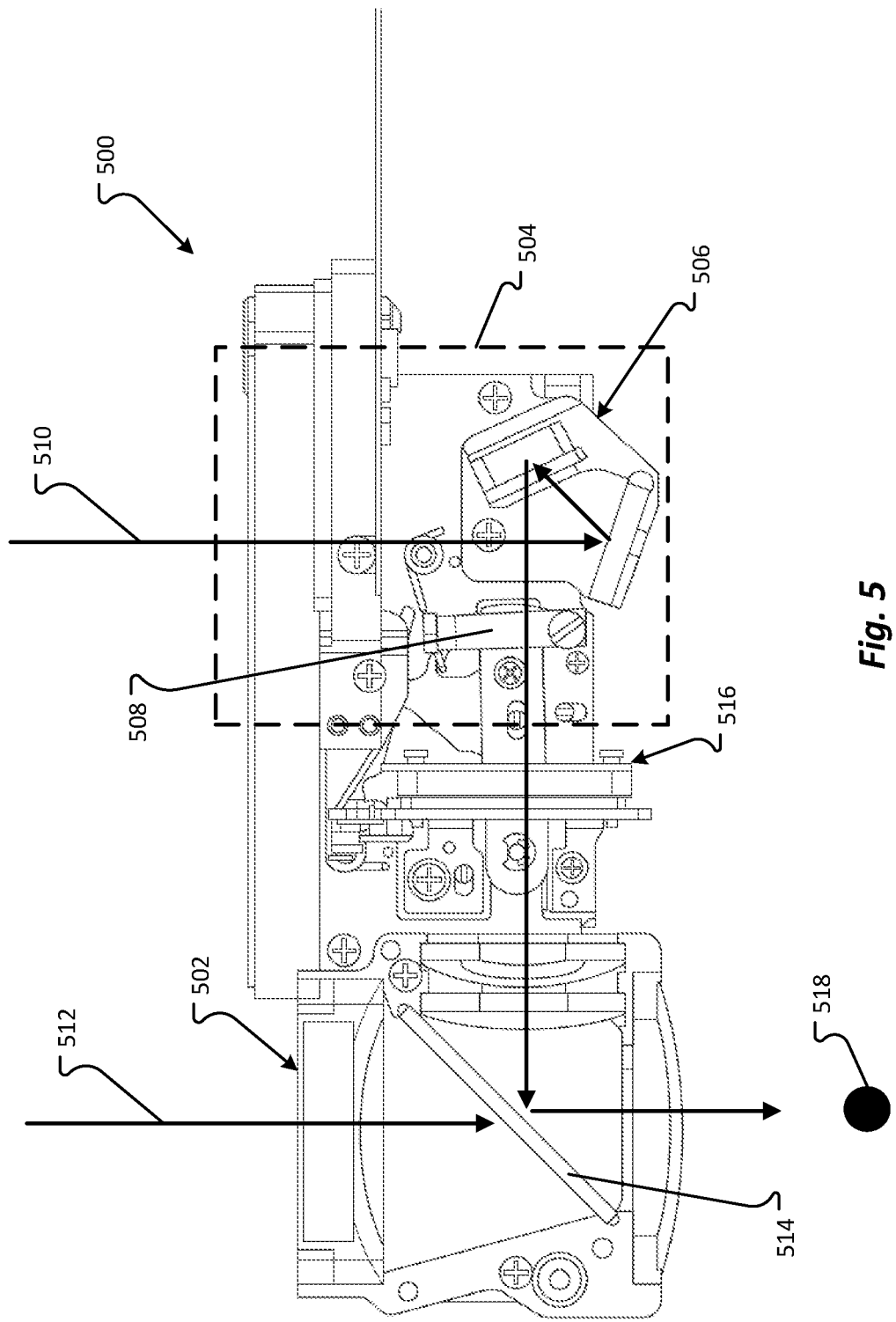

ELECTRONIC RANGEFINDER

CROSS-REFERENCE TO RELATED APPLICATIONS

This application claims priority to and the benefit of U.S. Provisional Patent Application No. 63/016,082, filed Apr. 27, 2020, and entitled "ELECTRONIC RANGEFINDER," which application is incorporated herein by reference in its entirety.

BACKGROUND

Modern rangefinder and SLR cameras can do many things extremely well and both types of cameras work well for acquiring images. A rangefinder camera is a camera fitted with a rangefinder, typically a split-image rangefinder. A range-finding focusing mechanism allows the photographer to measure the subject distance and take photographs that are in sharp focus. Most varieties of rangefinders show two images of the same subject, one of which moves when a calibrated wheel is turned. When the two images coincide and fuse into one, the distance can be read off the wheel or otherwise is coupled to a focusing mechanism so that the lens is focused correctly when the rangefinder images fuse. Because rangefinder cameras having separate optical viewfinders, such rangefinder cameras encourage you to focus your attention on what's going on around you rather than looking through the viewfinder to assess it, often leading one to acquire a better photograph or image.

However, telemetry, or the process of transferring the distance to the focusing mechanism in current rangefinder cameras is done mechanically. There are various disadvantages related to designing a reliable, robust and functional system. For example, such system generally includes a high production cost and high maintenance costs because adjustments to new lens may require custom equipment and may disrupt the ability of a user to use the camera. Some lenses used by rangefinder cameras cannot be trusted even on a quality camera due in part to poor manufacturing quality. In this case, the user has to choose between a good focus at short distance or long distance.

SUMMARY

In accordance with examples of the present disclosure, methods and systems are provided that are directed to camera systems equipped with a coinciding image rangefinder and viewfinder. Accordingly, aspects of this disclosure resolve accuracy issues that are inherent in mechanical, static rangefinders, with a method designed to control the lens focus assembly on one side and the optical coinciding rangefinder on the other side. Thus, trusted and adjustable lenses as facilitated by a rangefinder camera can provide a quality image at a wide variety of distances. In some examples, projected information, including but not limited to framelines, shutter speed, and sensitivity may be projected to the viewfinder portion of a digital rangefinder camera.

Aspects of the present disclosure are directed to a digital rangefinder camera in accordance with examples of the present disclosure. The digital rangefinder camera may include a viewfinder assembly configured to receive a first optical image from a first optical path. Further, the digital rangefinder camera may include a focus ring movement detection assembly configured to detect an amount of movement associated with a focus ring of a lens attached to the digital rangefinder camera. In addition, the digital rangefinder camera may include a processing device configured to provide a movement signal indicative of the amount of movement associated with the focus ring to an actuator coupled to an optical element, the actuator moving the optical element and displacing a second optical image from a second optical path directed toward an optical component in the viewfinder assembly, wherein the optical component in the viewfinder assembly is configured to project the first optical image and the second optical image toward a common viewing position when the first optical image and the second optical image coincide.

Aspects of the present disclosure are directed to a digital rangefinder camera including a viewfinder assembly configured to receive a first optical image from a first optical path in accordance with examples of the present disclosure. The digital rangefinder camera may include a focus ring movement detection assembly configured to detect an amount of movement associated with a focus ring of a lens attached to the digital rangefinder camera; and a processing device configured to provide a movement signal indicative of the amount of movement associated with the focus ring to an actuator coupled to an optical element, the actuator moving the optical element and displacing a second optical image from a second optical path directed toward an optical component in the viewfinder assembly. In examples, a display projection device is included, where the display projection device is configured to project a display into the viewfinder assembly, the display projection device providing a third optical path such that the optical component in the viewfinder assembly is configured to project the first optical image, the second optical image, and the display toward a common viewing position.

Aspects of the present disclosure are directed to a method for obtaining a coincident image in a digital rangefinder camera in accordance with examples of the present disclosure. The method may include receiving a first optical image via a first optical path; receiving a second optical image via a second optical path; detecting an amount of movement associated with a focus ring of a lens attached to the digital rangefinder camera; providing a movement signal indicative of the amount of movement associated with the focus ring to an actuator coupled to an optical element; and displacing the optical element via the actuator such that the second optical image from the second optical path is displaced in a viewfinder assembly thereby causing the first optical image and the second optical image to coincide.

BRIEF DESCRIPTION OF THE DRAWINGS

Non-limiting and non-exhaustive examples are described with reference to the following Figures.

FIG. 5 depicts details of a digital rangefinder camera in accordance with examples of the present disclosure;

DESCRIPTION

Figure 1:
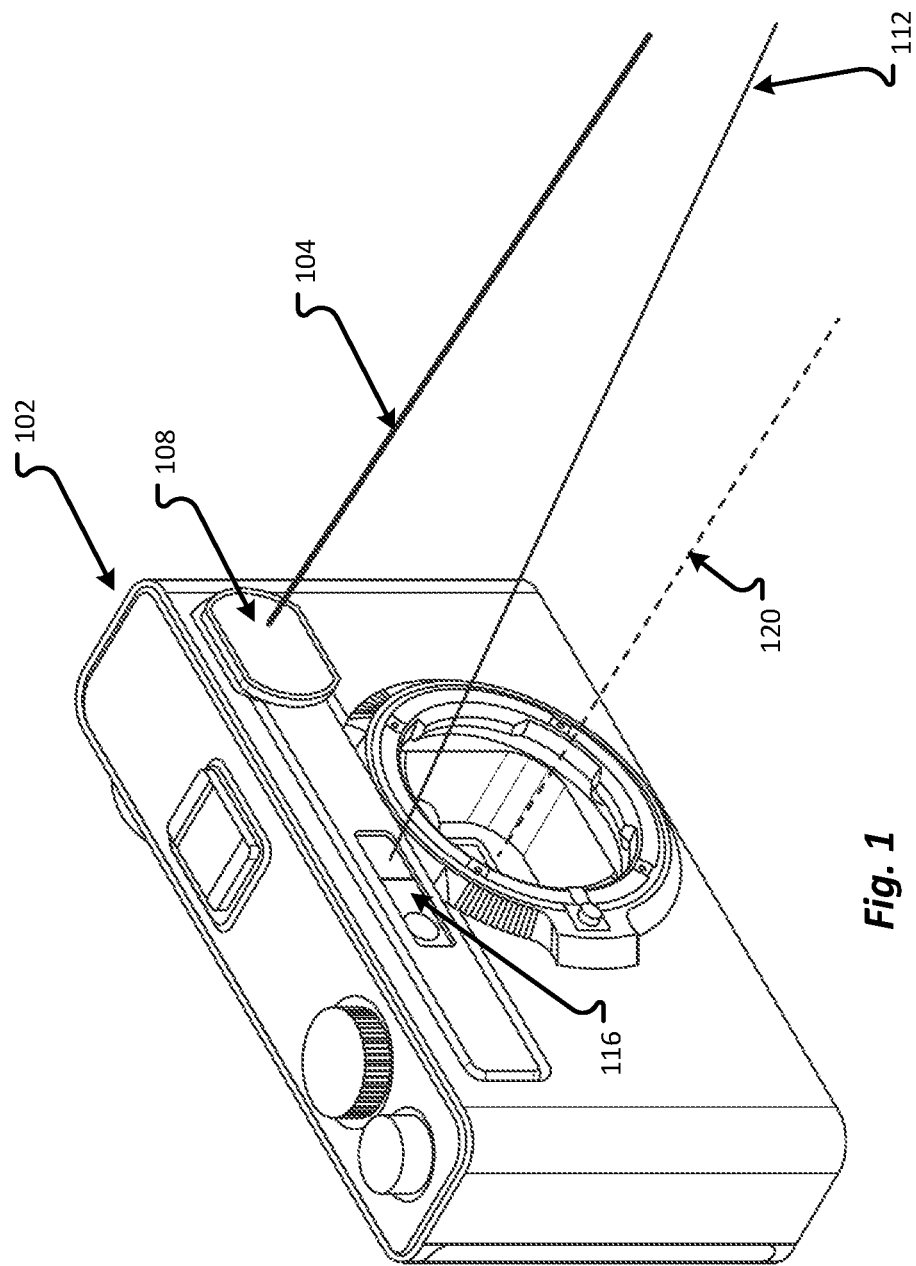
FIG. 1 depicts details of an optical rangefinder embedded in a camera in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, some examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with some examples, the present disclosure facilitates range finding by precisely adjusting an optical element within a secondary optical path to accurately coincide images formed from a primary optical path and a secondary optical path. The movement of the optical element can be adjusted, or calibrated remotely, and therefore does not require the digital rangefinder camera to be opened. Moreover, such calibration process can occur rather quickly when compared to previous mechanical calibration processes. Accordingly, the systems and methods described herein may be used in various ways when implemented in a digital rangefinder camera. For example, when used by an operator, the rangefinder portion behaves like a mechanical rangefinder having high accuracy. From a factory perspective, initial settings and calibrations can be performed with ease because the moveable components described herein can be controlled electronically and updated remotely. Moreover, an automatic calibration protocol may be realized to calibrate each rangefinder in each digital camera. In some examples, the recalibration process can be performed remotely or directly by the operator when he/she wishes to change the lens and when he/she notices a different behavior exhibited by the camera. Further, personalized telemetry profiles may be created and stored for each digital camera based on operator, lens, and/or camera/lens pair.

In some examples, to save energy, a rangefinder window may disappear. In some examples, a mechanical spring, magnetic attraction, gravity, or the like may cause the rangefinder window to disappear thereby saving energy. For example, when the window is hidden, a focus ring of a lens is not moving such that less energy (e.g., power) is used, thereby preserving battery charge. In some examples, focus information may be provided to the operator when the operator is aiming the rangefinder camera; once finished, the rangefinder window may disappear.

In accordance with some examples of the present disclosure, additional information may be provided to the user in an augmented reality like view. For example, focal information, shutter speed, a menu, etc. may be projected to the user via a projection device within the rangefinder camera. Such information may also include framelines and may be displayed to a user when a user looks through a viewfinder portion of the digital rangefinder camera.

FIG. 1 provides an overview of an optical rangefinder 116 embedded in a digital rangefinder camera 102 in accordance with examples of the present disclosure. The optical rangefinder 116 is a device that measures subject distance. Through a ranging finding device, two images are rendered inside a viewfinder 108, one image being formed from light entering the viewfinder 108 through the primary optical path 104 and one image being formed from light entering the optical rangefinder 116 through the secondary optical path 112. The primary optical path 104 may be considered a viewfinder optical path and the secondary optical path 112 may be considered a rangefinder optical path. When the two images formed in the viewfinder 108 coincide, a correct distance to a subject is obtained, where the subject may be an object of which an image is obtained. Accordingly, light from the sensor image path 120 may be directed to an image sensor within the digital rangefinder camera 102 and an image may be obtained. In examples, an optical lens group may be attached to the digital rangefinder camera 102 such that when the two images formed in the viewfinder 108 coincide, an image of the subject that is obtained is in focus.

Figure 2:
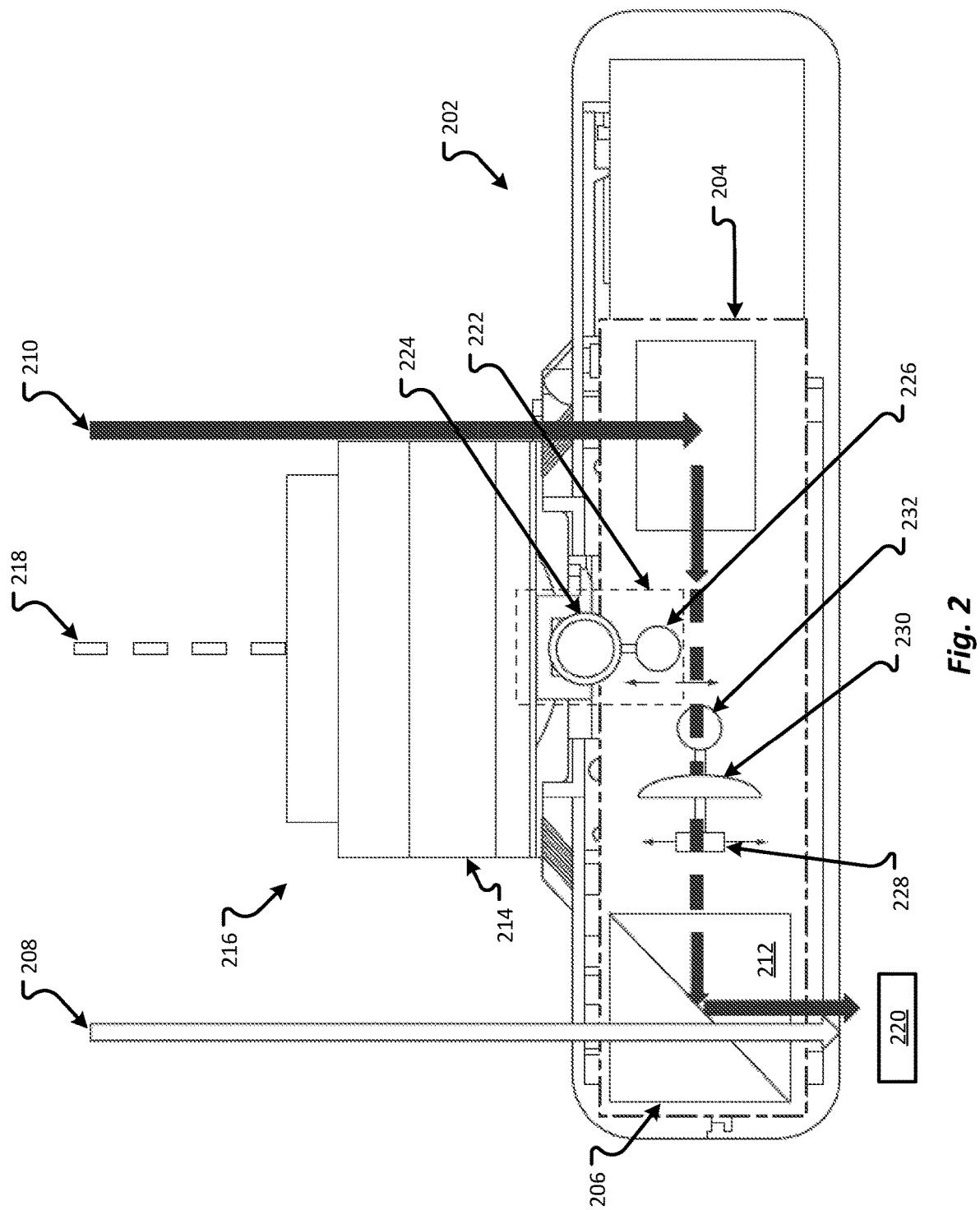
FIG. 2 depicts details directed to the mechanical implementation of the rangefinder camera in accordance with examples of the present disclosure.

FIG. 2 depicts details directed to the mechanical implementation of the digital rangefinder camera 202 in accordance with examples of the present disclosure. The digital rangefinder camera 202 may be the same as or similar to the digital rangefinder camera 102 (FIG. 1) as previously described. The digital rangefinder camera 202 may be equipped with an optical rangefinder; the optical rangefinder may include one or more components within the dotted rectangle 204. As previously discussed, the viewfinder 206 of the digital rangefinder camera 202 pairs a primary optical path 208 with a secondary optical path 210 using an optical component 212 (e.g., beam splitter). By moving a lens focus ring 214 of a lens assembly 216 in the sensor image optical path 218, a coincidence is established between the primary optical path 208 and the secondary optical path 210 at the optical component 212; upon establishing a coincidence between an image formed via the primary optical path 208 and an image formed via the secondary optical path 210, information can be provided to a user at viewing position 220 that a focus adjustment has been performed at the lens assembly 216. For example, a user at a viewing position 220 may view an image that is blurry when an image formed via the primary optical path 208 and an image formed via the secondary optical path 210 are not coincident. Accordingly, the user may adjust the lens focus ring 214 of the lens assembly 216 to bring an image formed via the primary optical path 208 and an image formed via the secondary optical path 210 into a state of coincidence.

In some examples, a focus ring movement detection assembly 222 may detect or otherwise monitor the movement of the focus ring 214 of the lens assembly 216. The focus ring movement detection assembly 222 may include a mechanical component 224 in contact with or otherwise coupled to the focus ring 214 of the lens assembly 216 and a sensor 226. The mechanical component 224 may move in accordance with the movement of the focus ring 214. The sensor 226 may detect the movement of the mechanical component 224 and provide an indication of the movement of the mechanical component 224 to the sensor 226. Accordingly, the movement of the focus ring 214 of the lens assembly 216 may be provided to a processing device for additional processing and storage.

That is, the movement of the focus ring 214 of the lens assembly 216 may be monitored by the sensor 226 and the mechanical component 224 of the focus ring movement detection assembly 222 such that an indication corresponding to the focus ring 214 movement can be provided to a processing device for further processing. Non-limiting examples of the sensor 226 include a magnetic sensor, a resistive sensor, or an optical sensor. In some examples, the focus ring movement detection assembly 222 may include a mechanical part, such as component 224, that is in contact with the focus ring 214 of the lens assembly 216 and when the lens moves, the mechanical part will move also with a linear or circular motion. In some examples, the motion can be evaluated with a magnetic sensor, such as sensor 226, which will read the position of a magnet. In some examples, the motion can be evaluated by measuring the resistivity between two known elements. In some examples, the position may be tracked with an optical sensor that will detect a movement by reading a specific pattern on the mobile part. Of course, other implementations of measuring the movement of the focus ring 214 are contemplated.

An actuator 228 may receive an adjustment signal or movement amount corresponding to the detected movement of the focus ring 214 of the lens assembly 216 from the focus ring movement detection assembly 222. The adjustment signal or movement amount may be calibrated according to one or more parameters of the lens assembly 216. Accordingly, the actuator 228 may move the image displacement element 230 according to the adjustment signal or movement amount such that an optical image provided from the secondary optical path 210 is displaced according to the movement of the focus ring 214 of the lens assembly 216. As a portion of a feedback mechanism, a sensor 232 may detect the movement of the image displacement element 230 and provide the detected movement to a processing device. As a result of the image displacement element 230 displacing an optical image from the secondary optical path 210 reflected from the optical element 234 and directed to a reflective portion of an optical component 212 (e.g., beam splitter), the primary optical path 208 and the secondary optical path 210 may be coincident such that a user at viewing position 220 would see a single image. Thus, a user may instruct the digital rangefinder camera to acquire an image. Accordingly, a shutter may open allowing light though the lens assembly 216 to be projected to an image sensor. The image sensor may acquire an image indicative of the coincident image as seen at the viewing position 220.

In some examples, the actuator 228 can operate in a step-by-step, magnetic, or piezoelectric manner. For example, the actuator 228 may be a piezoelectric actuator. The actuator 228 will generally provide a linear movement or circular movement depending on the image displacement element 230. Of course, other implementations to move the image displacement element 230 are contemplated. The image displacement element 230 may also be referred to as an optical element.

Figure 3:
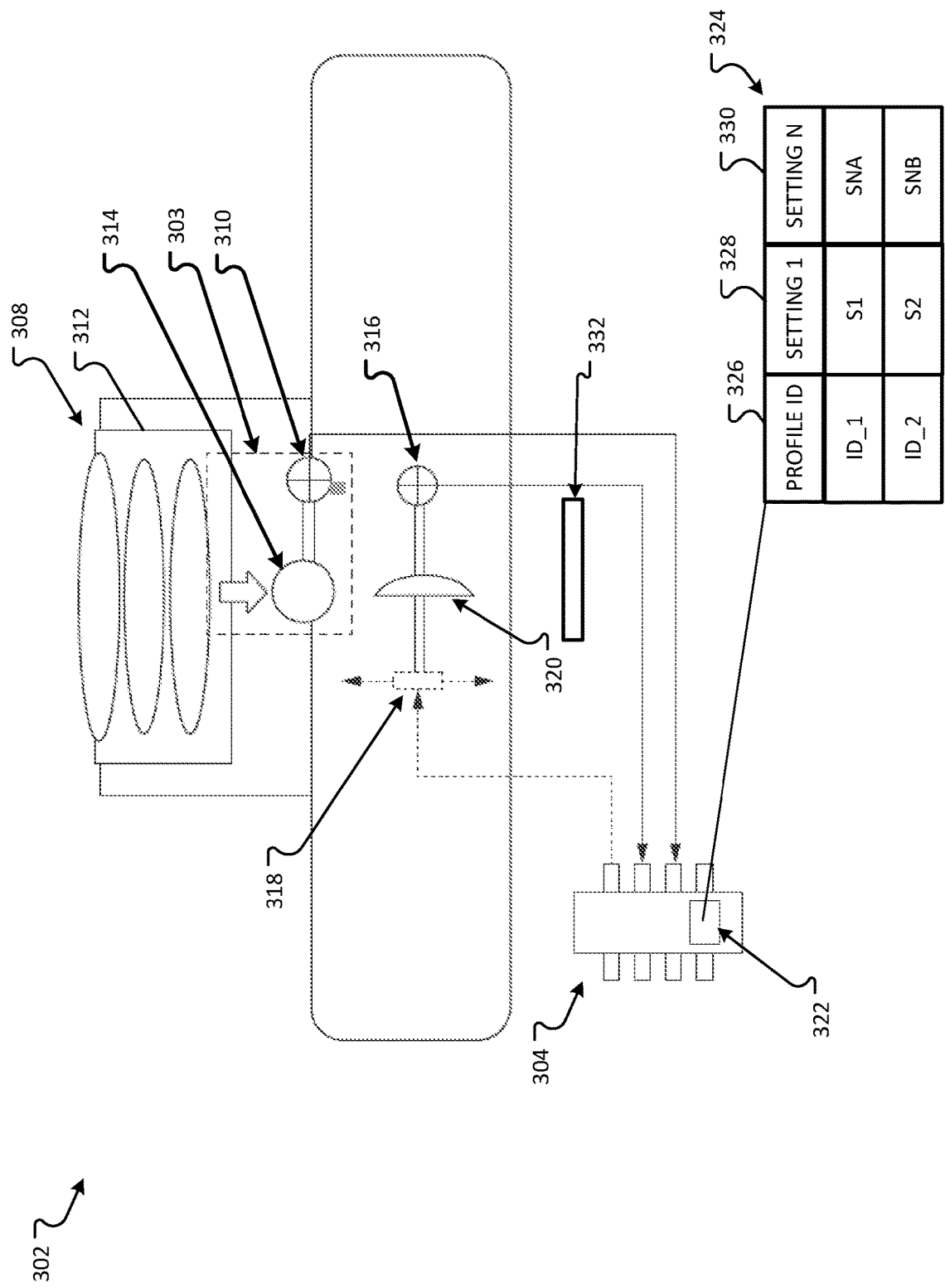
FIG. 3 depicts a first diagram directed to one or more components of a rangefinder camera in accordance with examples of the present disclosure.

FIG. 3 depicts a first diagram directed to controlling one or more components of a rangefinder camera, such as the digital rangefinder camera 202 in accordance with examples of the present disclosure. The digital rangefinder camera 302 may be the same as or similar to the digital rangefinder camera 202 (FIG. 2) as previously described. A processing device 304 may receive information from the focus ring movement detection assembly 303 indicating that the focus ring of the lens assembly 308 has moved. In examples, the processing device 304 receives information that the focus ring is moving by receiving the readings from the sensor 310 induced by the movement of the optical block 312 of the lens assembly 308 via a pressure roller 314. The processing device may receive sensor information from the sensor 316; therefore the processing device 304 may detect an absolute position of the focus ring of the lens assembly 308. Based on a position provided by the sensor 316 and the detected position of the focus ring, the processing device 304 may provide an instruction to the actuator 318 to move the optical element 320 (or image displacement element) from an initial position to a position indicative of the absolute position of the focus ring. The processing device 304 may continuously verify the accuracy of the sensed position provided by the sensor 316 after providing the initial instruction to move the optical element 320 to achieve the best optical coincidence possible.

In some examples, the digital rangefinder camera, such as the digital rangefinder camera 102 (FIG. 1) may be equipped with a certain optical group; the processing device 304 may retrieve a specific adjustment profile from a database or storage area 322 specific to the optical group. Accordingly, the processing device may provide an adjustment signal or movement amount to the actuator 318 based on the specific adjustment profile to modify or fix a focus shift of the optical group (e.g., lens assembly 308) installed on the digital rangefinder camera, such as the digital rangefinder camera 102 (FIG. 1).

In some examples, the processing device 304 may initiate a calibration process in which the processing device may record a position of the optical group (e.g., lens assembly 308) as assessed by the sensor 310 for one or more known distances or key-points. The processing device 304 may compute a difference between a standard adjustment profile and a new profile that may be required to correct for a distance/focus shift of a new optical group (e.g., lens assembly 308) being calibrated as part of the calibration process. Accordingly, the processing device 304 may interpolate remaining distance points and record a new adjustments into its database or storage area 322. Once recorded into its database or storage area 322, the new adjustment profile can be selected by a user to instruct the processing device 304 to follow the new adjustment profile.

FIG. 3 depicts one or more components that are the same as or similar to components previously described in FIG. 2. For example, the focus ring movement detection assembly 303 may be the same as or similar to the focus ring movement detection assembly 222 of FIG. 2 The lens assembly 308 may be the same as or similar to the lens assembly 216 of FIG. 2. The sensor 310 may be the same as or similar to the sensor 226 of FIG. 2. The sensor 316 may be the same as or similar to the sensor 232 of FIG. 2. The actuator 318 may be same as or similar to the actuator 228 of FIG. 2. The optical element 320 may be same as or similar to the image displacement element 230 of FIG. 2. The pressure roller 314 may be the same as or similar to the mechanical component 224.

FIG. 3 further depicts an example of a data structure 324 in accordance with examples of the present disclosure. The data structure 324 may store one or more configuration settings associated with various adjustment profiles. As an example, the data structure 324 may include a plurality of fields; for example, the data structure may include a Profile_ID field 326 uniquely identifying adjustment profiles. In addition, one or more configuration settings 328 and 330 may be included. Such configuration settings 328 and 330 may correspond to various adjustment points associated with an adjustment profile. In examples, the data structure 324 is stored in the database or storage area 322 of the processing device 304.

A user may instruct the digital rangefinder camera 302 to acquire an image. Accordingly, a shutter may open allowing light though the lens assembly 308 to be projected to an image sensor 332. The image sensor may acquire an image indicative of the coincident image as seen at the viewing position 220 (FIG. 2).

Figure 4:
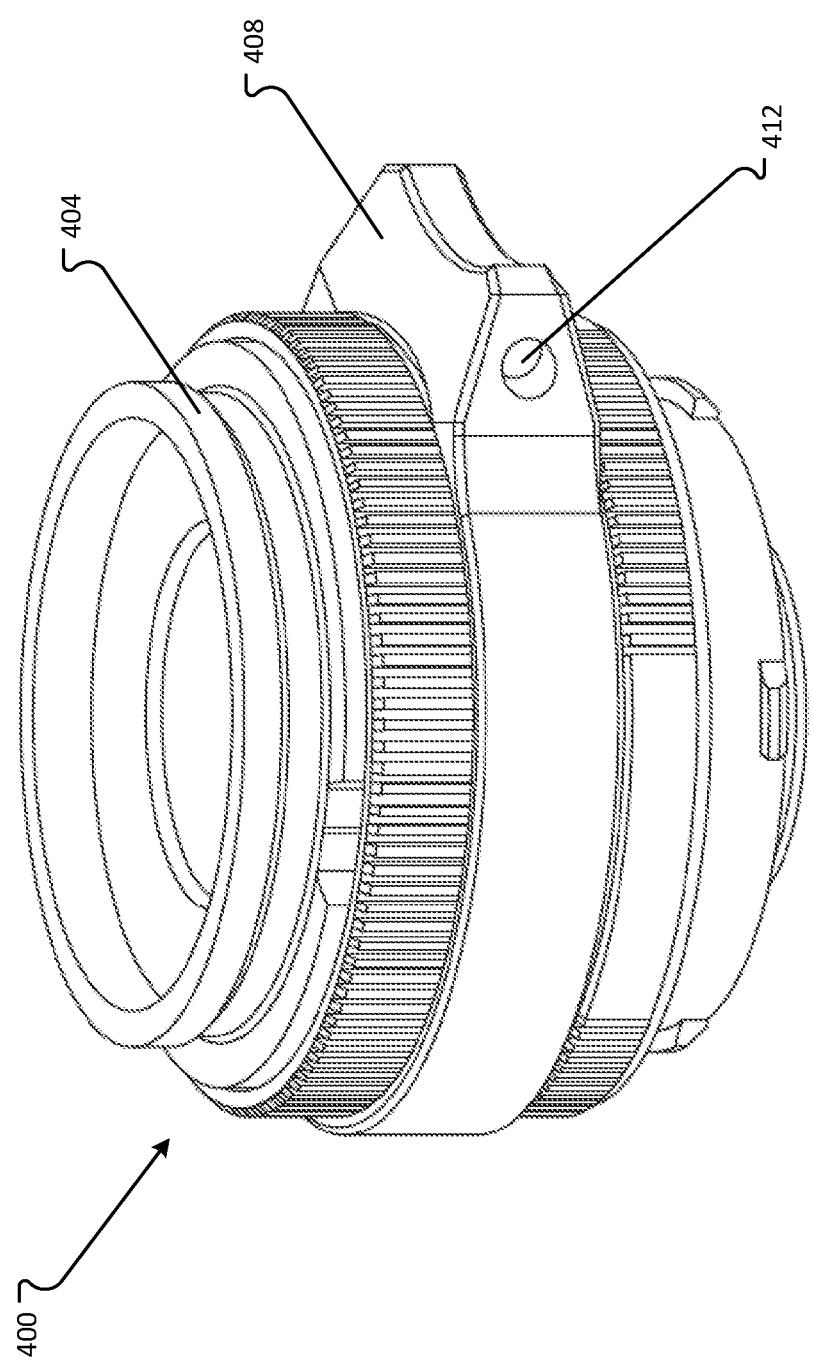
FIG. 4 depicts additional details of a ring assembly in accordance with examples of the present disclosure.

FIG. 4 depicts additional details of a lens assembly 400 in accordance with examples of the present disclosure. The lens assembly 400 may include an optical lens 404, a diaphragm/focus ring 408, and a lens identification module 412. In some examples, a lens identification process may occur whereby a processor associated with the digital rangefinder camera may identify and have access to static and dynamic lens information. In some examples, the lens identification module may communicate wirelessly to a processor in the digital rangefinder camera for those lens assemblies 400 that do not have electrical contacts to communicate with the digital rangefinder camera, such as the digital rangefinder camera 102 (FIG. 1).

The lens identification module 412 may first provide lens identification information to a processor in the digital rangefinder camera. For example, the processing device 304 (FIG. 3) may receive lens identification information from the lens identification module 412. The lens identification information may uniquely identify one or more of the lenses 404 and/or an assembly of lenses, such as the lens assembly 400. Once the processing device, such as the processing device 304 (FIG. 3) receives the lens identification information associated with the lens, such as the lens 404, the processing device may automatically load a lens specific configuration or lens profile from its database or storage area, such as the storage area 322 (FIG. 3) without requiring a manual intervention from the user. The lens identification information may include but is not limited to a lens brand and/or lens focal information. In some examples, the lens identification module 412 may determine an angular position of a lens identification element due to its strategic position on the diaphragm/focus ring 408. The position of the lens identification element may be chosen by a camera operator according to his/her preferences. As an example, the dynamic information received from the position of the lens identification element may be provided to the processing device to provide important metadata used by RAW image file developers to dynamically correct for vignetting based on the lens type, lens aiming distance, and/or lens aperture. Vignetting is a reduction of an image's brightness or saturation toward the periphery compared to the image center.

FIG. 5 depicts additional details of a digital rangefinder camera 500 in accordance with examples of the present disclosure. Similar to FIG. 2, the digital rangefinder camera may include a viewfinder 502 and an optical rangefinder portion 504 including an optical component 506 and image displacement element 508. As previously discussed, a secondary optical path 510 may enter the optical rangefinder portion 504 and be reflected to an image displacement element 508 via an optical component 506. Non-limiting examples of the optical component 506 include a prism or mirror. In examples, the secondary optical path is adjusted via the image displacement element 508 and combined with the primary optical path 512 that enters the viewfinder 502. The primary optical path 512 and secondary optical path 510 may be combined using a beam splitter 514.

In examples, the digital rangefinder camera 500 may include a frameline projection assembly 516. The frameline projection assembly 516 may project framelines as visual lines seen in the viewfinder 502 indicating what will be captured in an image. The frameline projection assembly 516 may be disposed between the image displacement element 508 and the beam splitter 514. Alternatively, or in addition, the frameline projection assembly 516 may be disposed between the image displacement element 508 and the optical component 506. As will be described, other configurations are contemplated herein. The frameline projection assembly 516 projects one or more framelines to the beam splitter 514 such that the one or more framelines are visible to a user looking through the viewfinder 502 from a viewing position 518. Stated another way, the beam splitter 514 combines three source of light from three optical paths—the primary optical path 512, the secondary optical path 510, and a third optical path 520 projected from the frameline projection assembly 516—into a single optical path or beam. The single beam is then viewable at the viewing position 518. In examples, the frameline projection assembly 516 may include an aperture in which light from the second optical path passes.

Figure 6B:
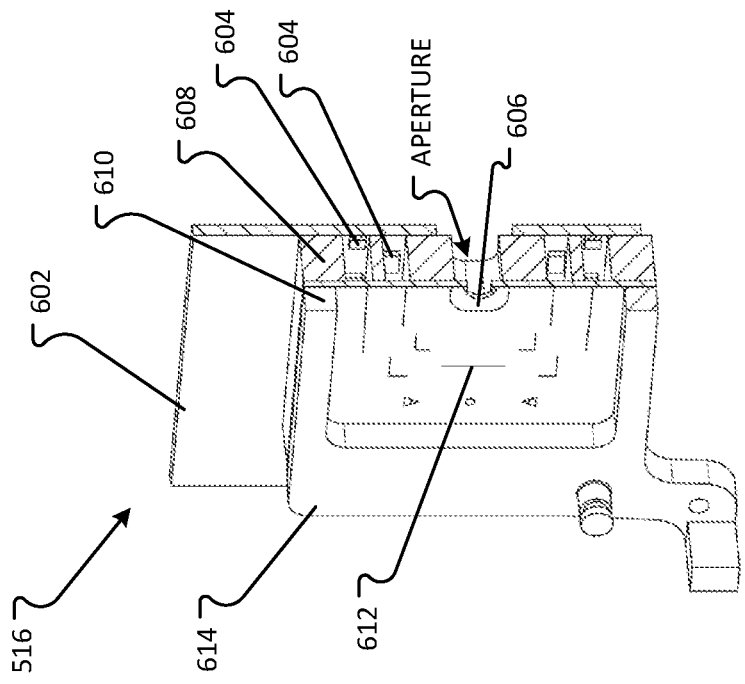
FIGS. 6A and 6B depict additional details of a frameline projection assembly in accordance with examples of the present disclosure.
Figure 6A:
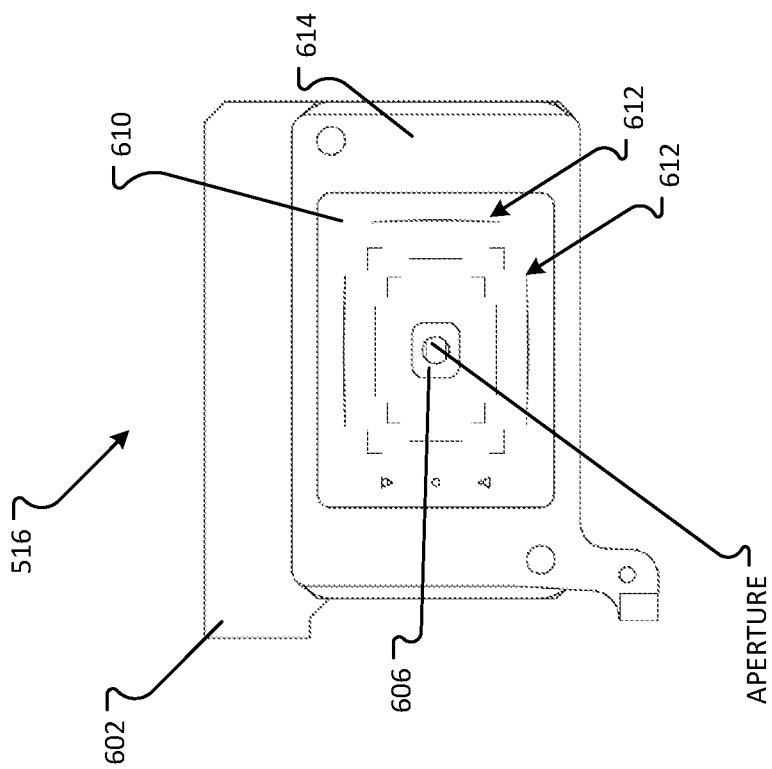

FIGS. 6A and 6B depict additional details of the frameline projection assembly 516 of FIG. 5 in accordance with examples of the present disclosure. More specifically, the frameline projection assembly 516 may include a printed circuit board 602 on which a plurality of light-emitting diodes 604 are attached. The plurality of light-emitting diodes 604 may be disposed in a space created between the printed circuit board 602, a diffusing element 606, and a spacer element 608. An etched stencil 610 including a plurality of etched framelines 612 may be disposed over the diffusing element 606. Accordingly, the diffusing element 606 may diffuse light emitted from the light-emitting diodes 604 such that the diffused light may pass through the plurality of etched framelines 612. In examples, the light passing through the etched framelines 612 may be directed to the beam splitter 514 (FIG. 514) as previously described. The etched stencil 610 may be secured to the diffusing element 606, the spacer element 608, and the printed circuit board 602 via an outer frame assembly 614. Additionally, the frameline projection assembly 516 includes an aperture 616 which allows the second optical path (e.g., 510 of FIG. 5) to pass.

Figure 7:
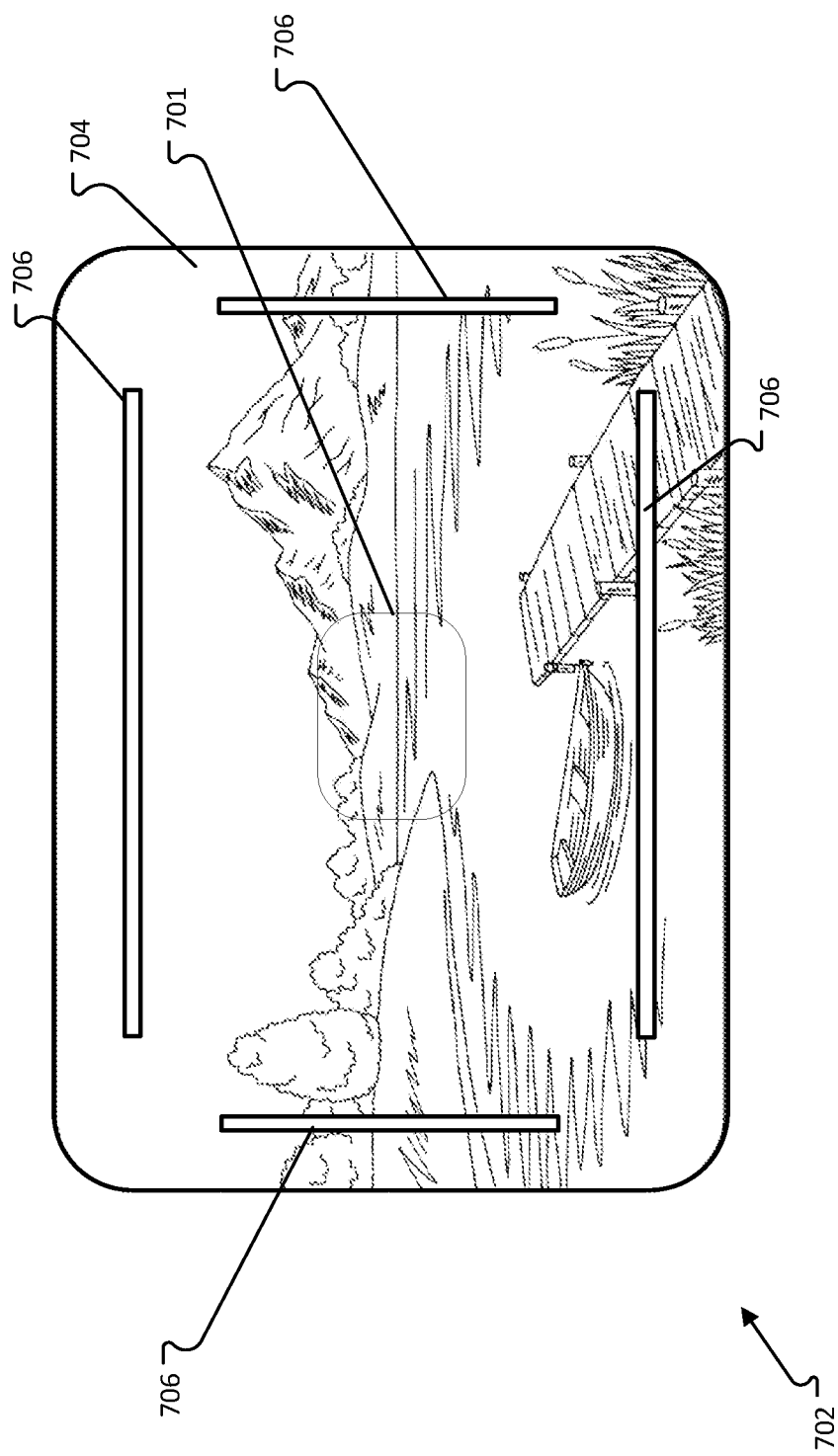
FIG. 7 depicts an example image as viewed from a viewing position in accordance with examples of the present disclosure.

FIG. 7 depicts an example image 702 as viewed from the viewing position 518 in accordance with examples of the present disclosure. More specifically, the example image 702 may include a subject 704, such as an example landscape. A patch area 701 is displayed representing the image formed via the optical path from the rangefinder (e.g., optical path 510 for example). The projected framelines 706 may be projected over the subject 704 and represent the border or outer perimeter of an image acquired by an image sensor of the digital rangefinder camera such that user views the projected framelines 706 as visual guide lines indicating what will be captured. Alternatively, or in addition, the projected framelines may assist a user in centering an image. While the projected framelines 706 are illustrated as being located at the periphery of the subject 704, in some examples, the projected framelines 706 may be in other locations.

Figure 8:
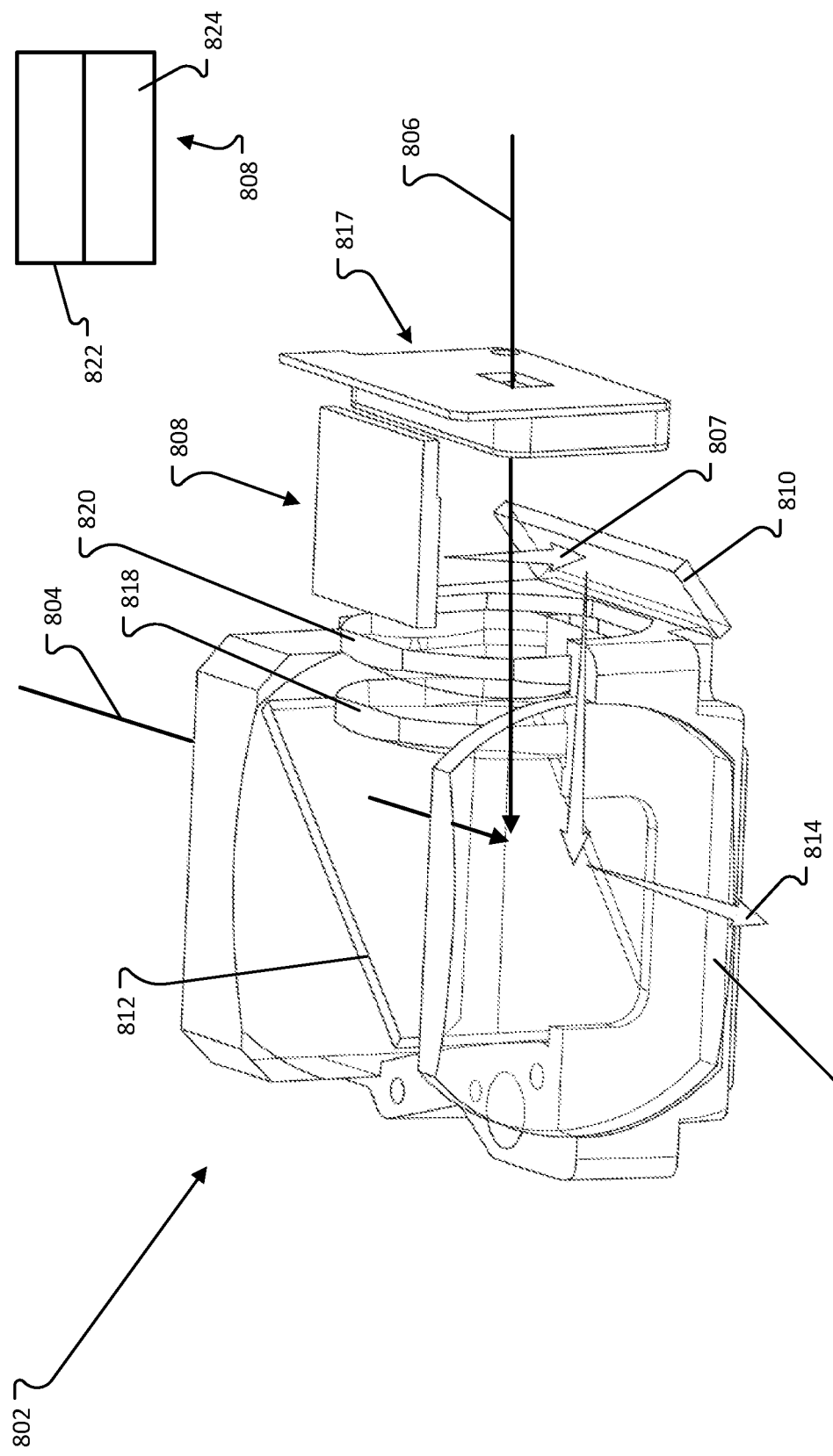
FIG. 8 depicts details directed to the partial projection of dynamic information into a viewfinder in accordance with examples of the present disclosure.

FIG. 8 depicts details directed to the partial projection of dynamic information into a viewfinder in accordance with examples of the present disclosure. The projection of dynamic information into the viewfinder generally assists a user when acquiring one or more images. For example, and similar to the projected framelines, information such as but not limited to shutter speed information, aperture information, and sensitivity information (e.g., ISO), battery charge status, and menu may assist a user when acquiring an image with the digital rangefinder camera. In examples, an image formed via the primary optical path 804 may be combined with an image formed via the secondary optical path 806 provided by the rangefinder. In addition, a third optical path 807 may include a projection of the dynamic information. For example, a projection device 808 projects the dynamic information to a reflective device 810, where the reflective device 810 may direct the projected dynamic information (e.g., optical beam including the dynamic information) to the beam splitter 812. Accordingly, a beam including the combination of the primary optical path 804, the secondary optical path 806, and the third optical path 807 is provided to a user as the resulting optical beam 814; the resulting optical beam 814 forms a combined image including an image from the primary optical path 804, the secondary optical path 806, and the third optical path 807. As further depicted in FIG. 8, the frameline projection assembly 817 may project framelines toward the beam splitter 812 such that the resulting optical beam 814 includes the projected framelines. The optical path of the projected framelines may be considered a fourth optical path. In examples, lens 816, 818, and 820 may focus or otherwise assist with aligning one or more optical paths and/or a resulting optical beam 814.

Non-limiting examples of the projection device 808 include a liquid crystal display (LCD), an organic light-emitting display (OLED), and the like. Thus, the resulting dynamic information as viewed from a user may be at a resolution that is provided by the projection device 808. In examples, the dynamic information may be limited to a specific portion or location within an image viewed at the viewfinder 802. For example, the projection device 808 may include a projection portion 822 and a printed circuit board portion 824. The projection portion 822 may project the dynamic information to the reflective device 810; as the reflective device 810 and the projection portion 822 may be sized at a height and/or width that is less than the height and/or width of the image and/or the beam splitter 812, the dynamic information may be projected to a specific location within the viewfinder 802. For example, the dynamic information may appear at the bottom of an image as seen in the viewfinder.

Figure 9:
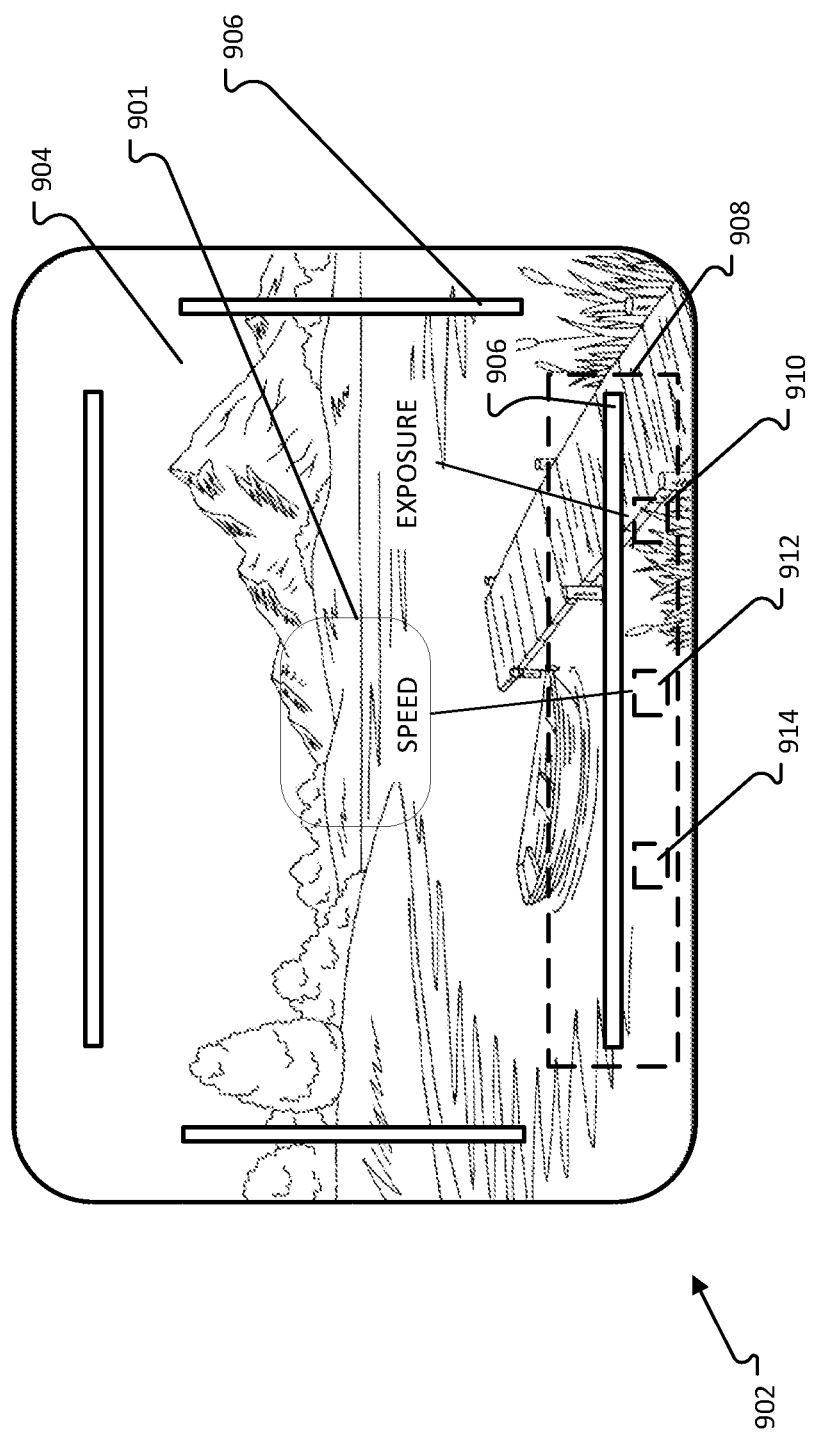
FIG. 9 depicts another example image as viewed from a viewing position in accordance with examples of the present disclosure.

FIG. 9 depicts an example image 902 as viewed from the viewing position 518 in accordance with examples of the present disclosure. More specifically, the example image 902 may include a subject 904, such as an example landscape. A patch area 901 is displayed representing the image formed via the optical path from the rangefinder (e.g., optical path 806 for example). In addition to including the projected framelines 906, which may be the same as or similar to the projected framelines 706 (FIG. 7) as previously described, the example image 902 may include a dynamic information area 908 corresponding to the height and the width of the projection device 808 (FIG. 8) and/or the reflective device 810 (FIG. 8). In examples, the dynamic information area 908 may be located in an area that is different than that which is illustrated in FIG. 9. Further, the dynamic information area 908 may be larger, smaller, or appearing in a different shape than that which is illustrated in FIG. 9. In examples, the dynamic information area 908 may display dynamic information in one or more areas 910, 912, and/or 914. Of course, more or less areas 910, 912, and/or 914 may be included. In examples, the area 910 may correspond to displaying exposure information and the area 912 may correspond to displaying speed information. Of course, other dynamic information to be displayed is contemplated such as a menu for example.

Figure 10A:
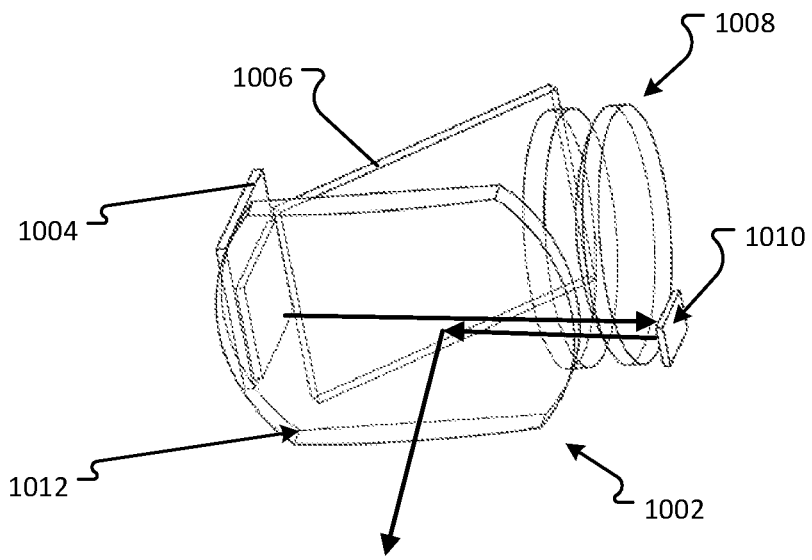
FIGS. 10A-10E depict alternative implementations directed to the partial projection of dynamic information into a viewfinder in accordance with examples of the present disclosure.
Figure 10B:
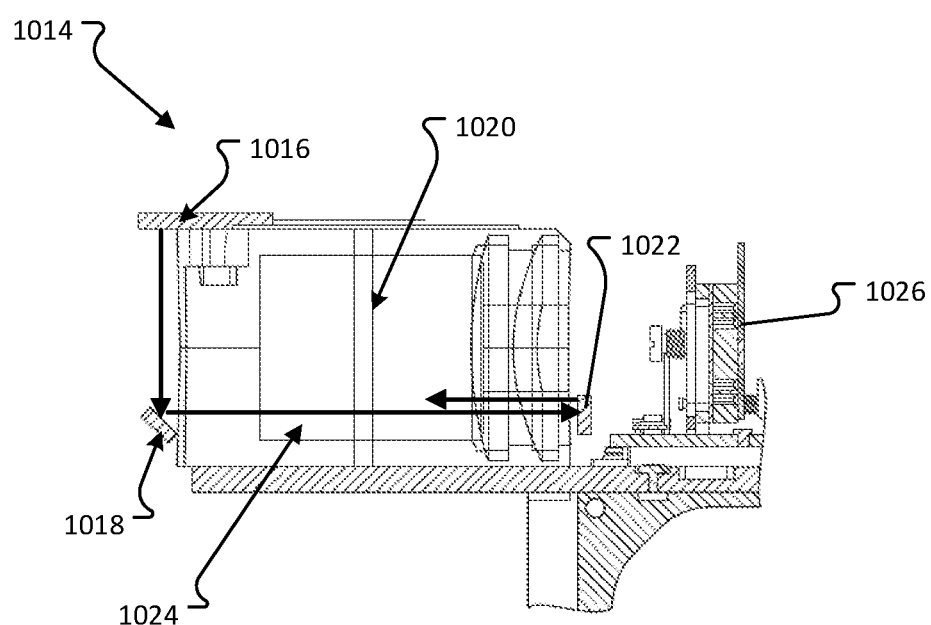

FIGS. 10A-10E depict alternative implementations directed to the partial projection of dynamic information into a viewfinder in accordance with examples of the present disclosure. As depicted in FIG. 10A, the projection device 1004 may reside at a different location than illustrated in FIG. 8 such that the information projected from the projection device 1004 passes through the beam splitter 1006, through the lens 1008 and to the reflective device 1010. The reflective device 1010 may direct the projected information back to the beam splitter 1006 such that the projected information is combined with information from a primary optical path and information from a secondary optical path. The resulting image formed via the combination of the information from the projection device, the first optical path, and the second optical path is then provided to a user through the lens 1012. As depicted in FIG. 10B, the projection device 1016 may reside at a different location with respect to the viewfinder 1014 than illustrated in FIG. 8 such that the information projected from the projection device 1016 passes to the reflection device 1018, through the beam splitter 1020, and to another reflection device 1022. The reflection device 1022 may direct the projected information to the beam splitter 1020 where such information is combined with information from a primary optical path and information from a secondary optical path. The resulting image formed via the combination of the information from the projection device, the first optical path, and the second optical path is then provided to a user through a lens 1024. In examples, the frameline projection device 1026 may project framelines to the beam splitter 1020 such that the framelines are combined with the information from the projection device, the first optical path, and the second optical path.

Figure 10C:
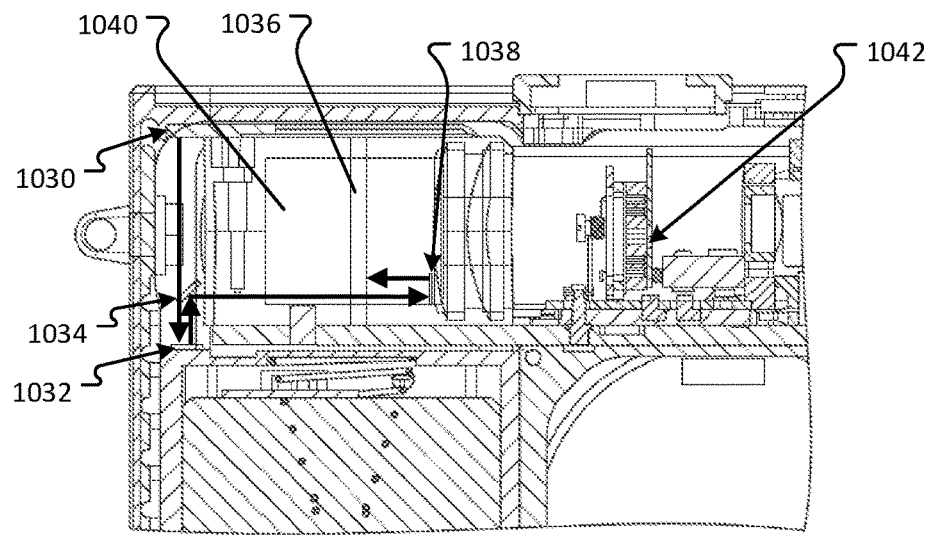

As depicted in FIG. 10C, the projection device 1030 may reside at a different location with respect to the viewfinder 1028 than illustrated in FIG. 8 such that the information projected from the projection device 1030 passes to the reflection device 1032, to the reflection device 1034, through the beam splitter 1036, and to another reflection device 1038. The reflection device 1038 may direct the projected information to the beam splitter 1036 where such information is combined with information from a primary optical path and information from a secondary optical path. The resulting image formed via the combination of the information from the projection device, the first optical path, and the second optical path is then provided to a user through a lens 1040. In examples, the frameline projection device 1042 may project framelines to the beam splitter 1036 such that the framelines are combined with the information from the projection device, the first optical path, and the second optical path.

Figure 10D:
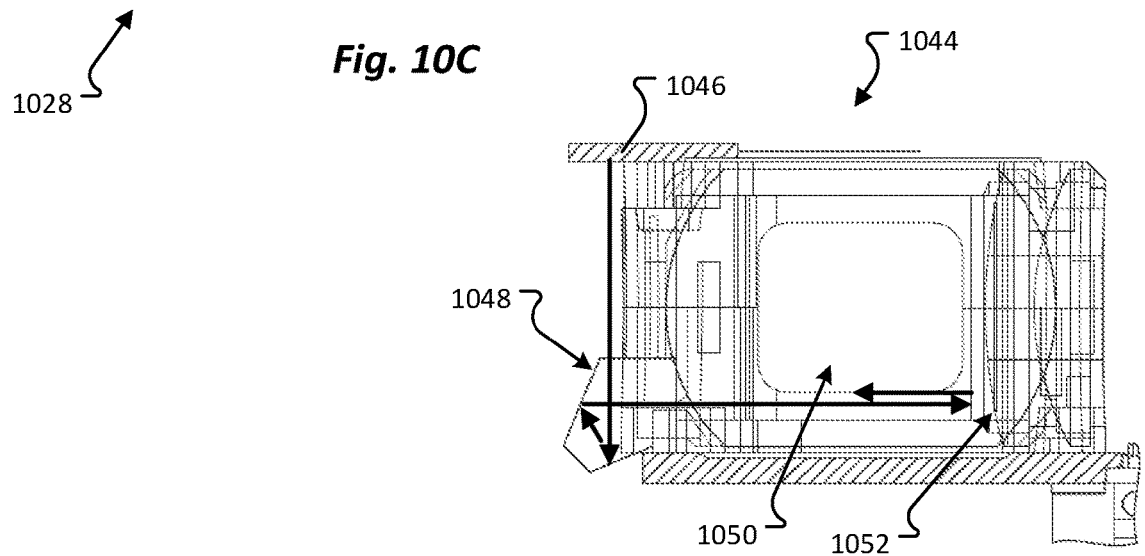

As depicted in FIG. 10D, the projection device 1046 may reside at a different location with respect to the viewfinder 1044 than illustrated in FIG. 8 such that the information projected from the projection device 1046 passes to a prism 1048, through the beam splitter 1050, and to the reflection device 1052. The reflection device 1052 may direct the projected information to the beam splitter 1050 where such information is combined with information from a primary optical path and information from a secondary optical path. The resulting image formed via the combination of the information from the projection device, the first optical path, and the second optical path is then provided to a user through a lens.

Figure 10E:
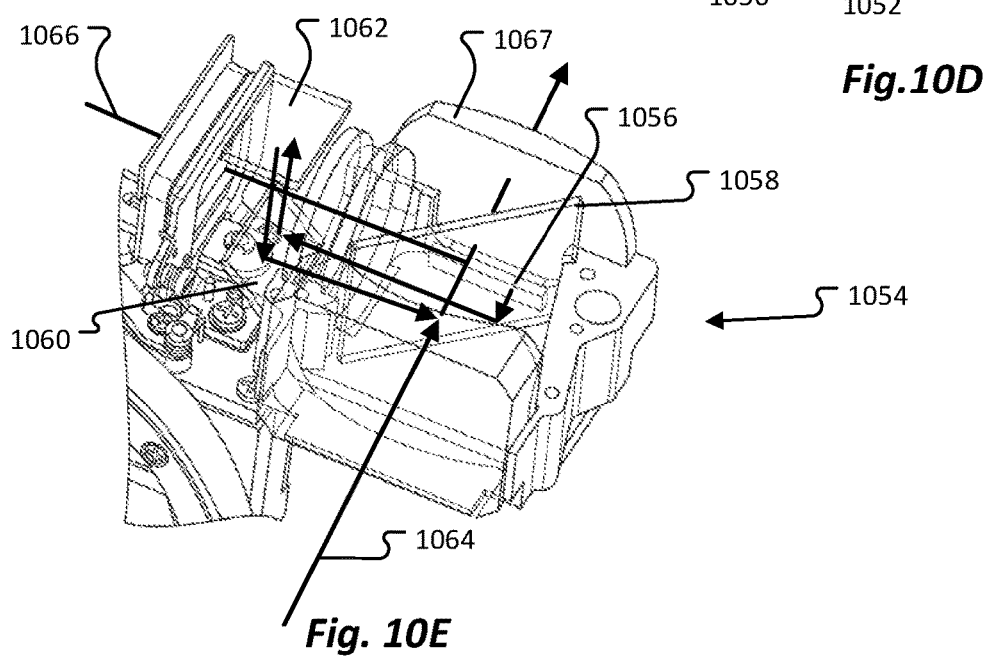

As depicted in FIG. 10E, the projection device 1056 may reside at a different location with respect to the viewfinder 1054 than illustrated in FIG. 8 such that the information projected from the projection device 1056 is redirected via the beam splitter 1058 toward a reflection device 1060. The reflection device 1060 redirects projected information to the reflection device 1062, which redirects the projected information back to the reflection device 1060 and back to the beam splitter 1058, where such information is combined with information from a first optical path 1064 and information from a second optical path 1066. The resulting image formed via the combination of the information from the projection device 1056, the first optical path 1064, and the second optical path 1066 is then provided to a user through a lens 1067. In examples, the frameline projection device 1068 may project framelines to the beam splitter 1058 such that the framelines are combined with the information from the projection device 1056, the first optical path 1064, and the second optical path 1066.

Figure 11:
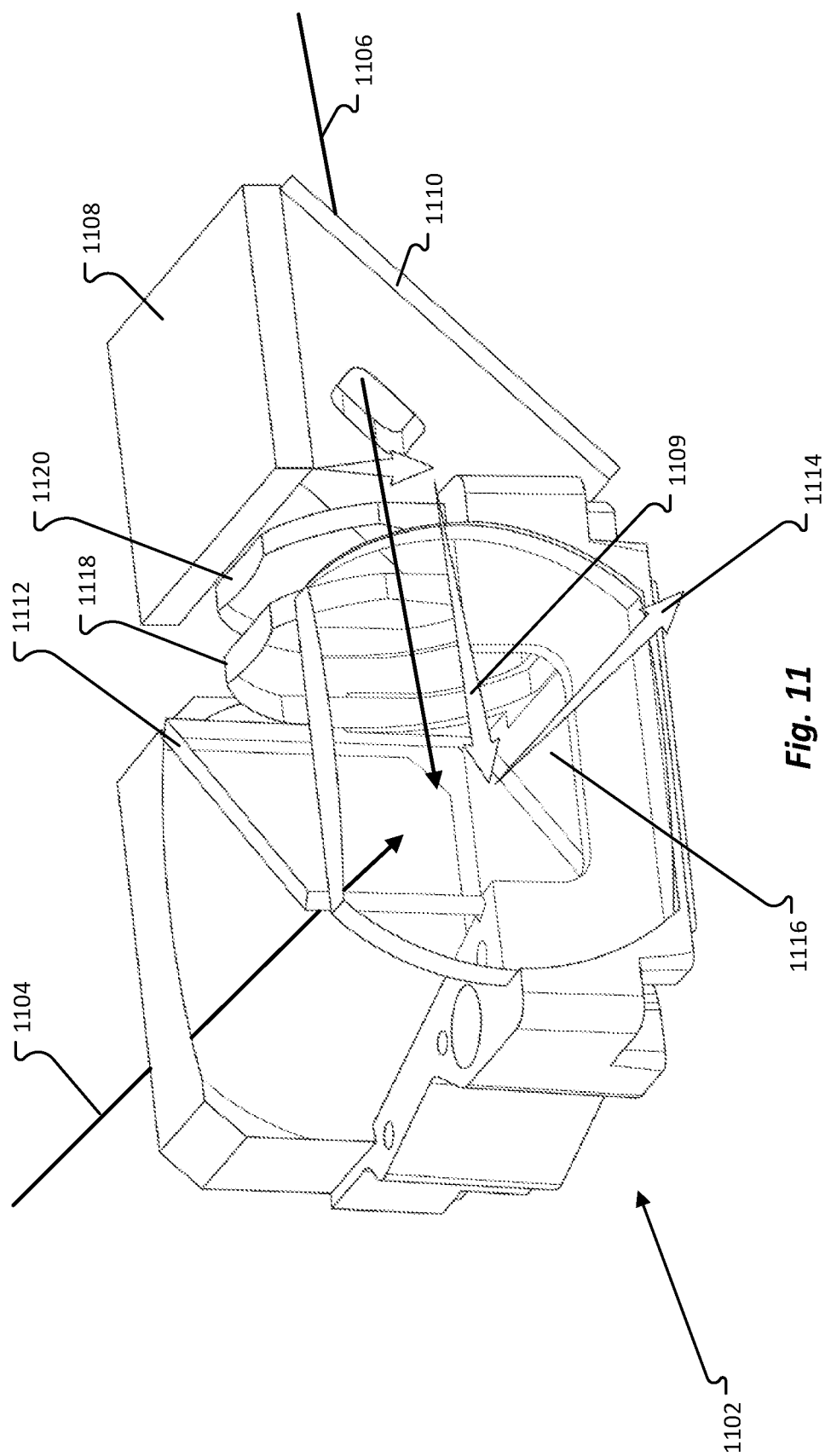
FIG. 11 depicts details directed to the complete projection of dynamic information into a viewfinder in accordance with examples of the present disclosure.

FIG. 11 depicts details directed to the complete projection of dynamic information into a viewfinder in accordance with examples of the present disclosure. As previously described, the projection of dynamic information into the viewfinder generally assists a user when acquiring one or more images. For example, and similar to the projected framelines, information such as but not limited to shutter speed information, aperture information, sensitivity information (e.g., ISO), battery charge status, and a menu may assist a user when acquiring an image with the digital rangefinder camera. In examples, an image formed via the primary optical path 1104 may be combined with an image formed via the second optical path 1106 provided by the rangefinder. In addition, a third optical path 1109 may include a projection of the dynamic information. For example, a projection device 1108 projects the dynamic information to a reflective device 1110, where the reflective device 1110 may direct the projected dynamic information (e.g., optical beam including the dynamic information) to the beam splitter 1112. Accordingly, a beam including the combination of the primary optical path 1104, the second optical path 1106, and the third optical path 1109 is provided to a user as the resulting optical beam 1114; the resulting optical beam 1114 forms a combined image including an image from the primary optical path 1104, the second optical path 1106, and the third optical path 1109. In examples, lens 1116, 1118, and 1120 may focus or otherwise assist with aligning one or more optical paths and/or a resulting optical beam 1114.

Non-limiting examples of the projection device 1108 include a liquid crystal display (LCD), an organic light-emitting display (OLED), and the like. Thus, the resulting dynamic information as viewed from a user may be at a resolution that is provided by the projection device 1108. In examples, the dynamic information may be displayed anywhere within an image when viewed at the viewfinder 1102. In examples, the reflection device 1110 may include an aperture 1122 allowing information in the second optical path 1106 to pass through the reflection device 1110. In examples, as the projection device is capable of projecting an image to nearly any location within an image when viewed at the viewfinder, the framelines may be projected from the projection device 1108 rather than from a stand-alone frameline projection device.

Figure 12:
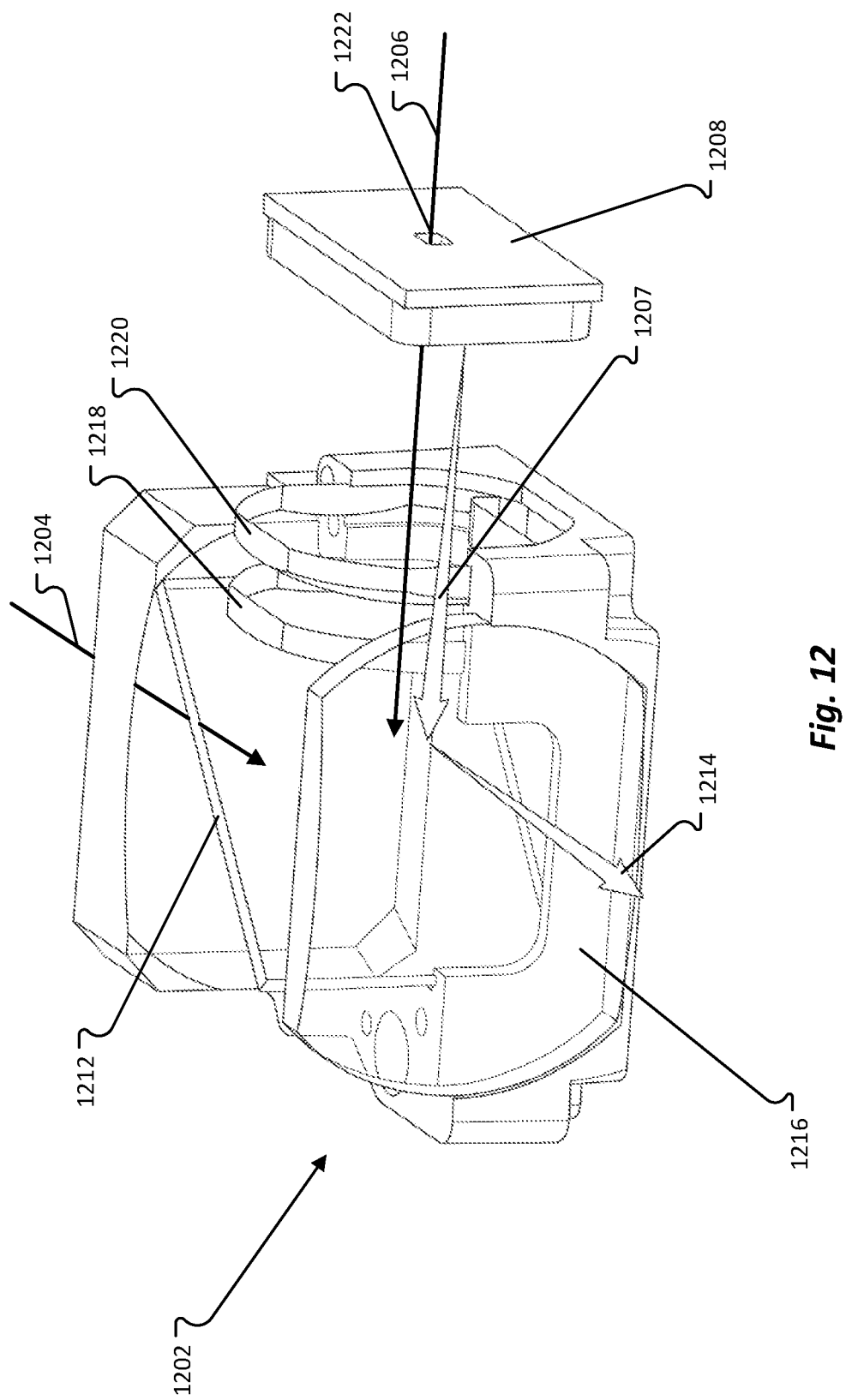
FIG. 12 depicts additional details directed to the complete projection of dynamic information into a viewfinder in accordance with examples of the present disclosure.

FIG. 12 depicts details directed to the complete projection of dynamic information into a viewfinder 1202 in accordance with examples of the present disclosure. As previously described, the projection of dynamic information into the viewfinder generally assists a user when acquiring one or more images. For example, and similar to the projected framelines, information such as but not limited to shutter speed information, aperture information, sensitivity information (e.g., ISO), battery charge status, and a menu may assist a user when acquiring an image with the digital rangefinder camera. In examples, an image formed via the primary optical path 1204 may be combined with an image formed via the secondary optical path 1206 provided by a rangefinder. In addition, a third optical path 1207 may include a projection of the dynamic information. For example, a projection device 1208 projects the dynamic information to the beam splitter 1212. Accordingly, a beam including the combination of the primary optical path 1204, the secondary optical path 1206, and the third optical path 1207 is provided to a user as the resulting optical beam 1214; the resulting optical beam 1214 forms a combined image including an image from the primary optical path 1204, the secondary optical path 1206, and the third optical path 1207. In examples, lens 1216, 1218, and 1220 may focus or otherwise assist with aligning one or more optical paths and/or a resulting optical beam 1214.

Non-limiting examples of the projection device 1208 include a liquid crystal display (LCD), an organic light-emitting display (OLED), and the like. Thus, the resulting dynamic information as viewed from a user may be at a resolution that is provided by the projection device 1208. In examples, the dynamic information may be displayed anywhere within an image when viewed at the viewfinder 1202. In examples, the projection device 1208 includes an aperture 1222 allowing information from the secondary optical path 1206 to pass through the projection device 1208 and to the beam splitter 1212. In accordance with examples of the present disclosure, the LCD and/or OLED may project colored light into the viewfinder.

Figure 13:
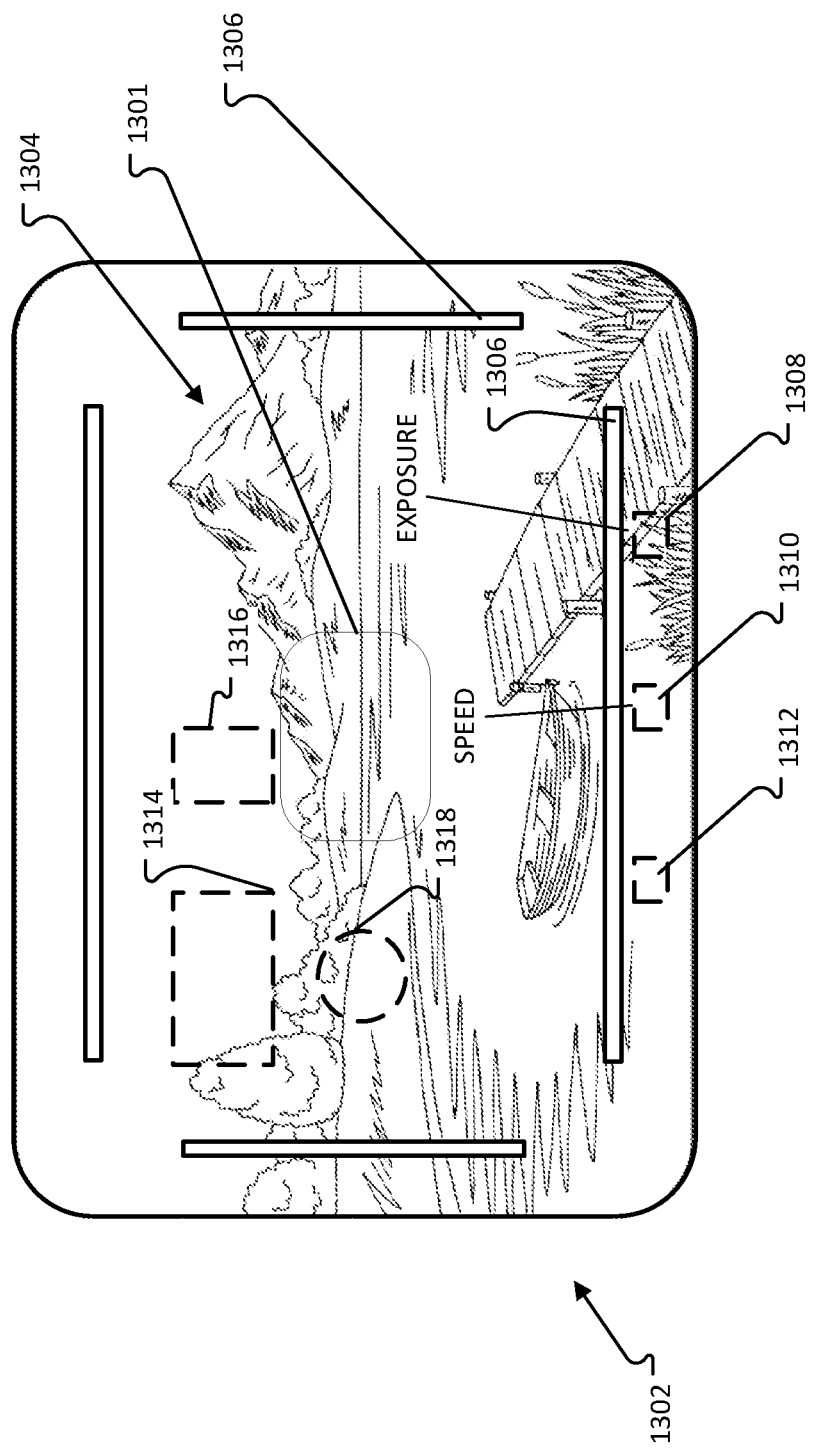
FIG. 13 depicts another example image from a viewfinder incorporating the capability to completely project dynamic information into an image viewed by a user at a viewing position into a viewfinder in accordance with examples of the present disclosure.

FIG. 13 depicts an example image 1302 as viewed from the viewing position 518 from a viewfinder incorporating the capability to completely project dynamic information into an image viewed by a user; such viewfinder may be the same or similar to the viewfinder 1102 (FIG. 11) and/or the viewfinder 1202 (FIG. 12) in accordance with examples of the present disclosure. More specifically, the example image 1302 may include a subject 1304, such as an example landscape. A patch area 1301 is displayed representing the image formed via the optical path from the rangefinder (e.g., optical path 1206 for example). In addition to including the framelines 1306, the example image 1302 may include dynamic information at various locations. In examples, the dynamic information may be displayed as dynamic information 1308, 1310, 1312, 1314, 1316, and/or 1318. As depicted in FIG. 13, the dynamic information may be displayed as dynamic information of various shapes and sizes. That is, the displayed dynamic information can be displayed located virtually anywhere within an image viewed from a viewfinder. As previously described, the dynamic information may include speed information, aperture information, and sensitivity information (e.g., ISO), battery charge status, and a menu. Further, the dynamic information area 908 may be larger, smaller, or appearing in a different shape than that which is illustrated in FIG. 9. In examples, the dynamic information area 908 may display dynamic information in one or more areas 910, 912, and/or 914. Of course, more or less areas 910, 912, and/or 914 may be included. In examples, the area 910 may correspond to displaying exposure information and the area 912 may correspond to displaying speed information. Of course, other dynamic information to be displayed is contemplated, such as but not limited to a menu.

Figure 14:
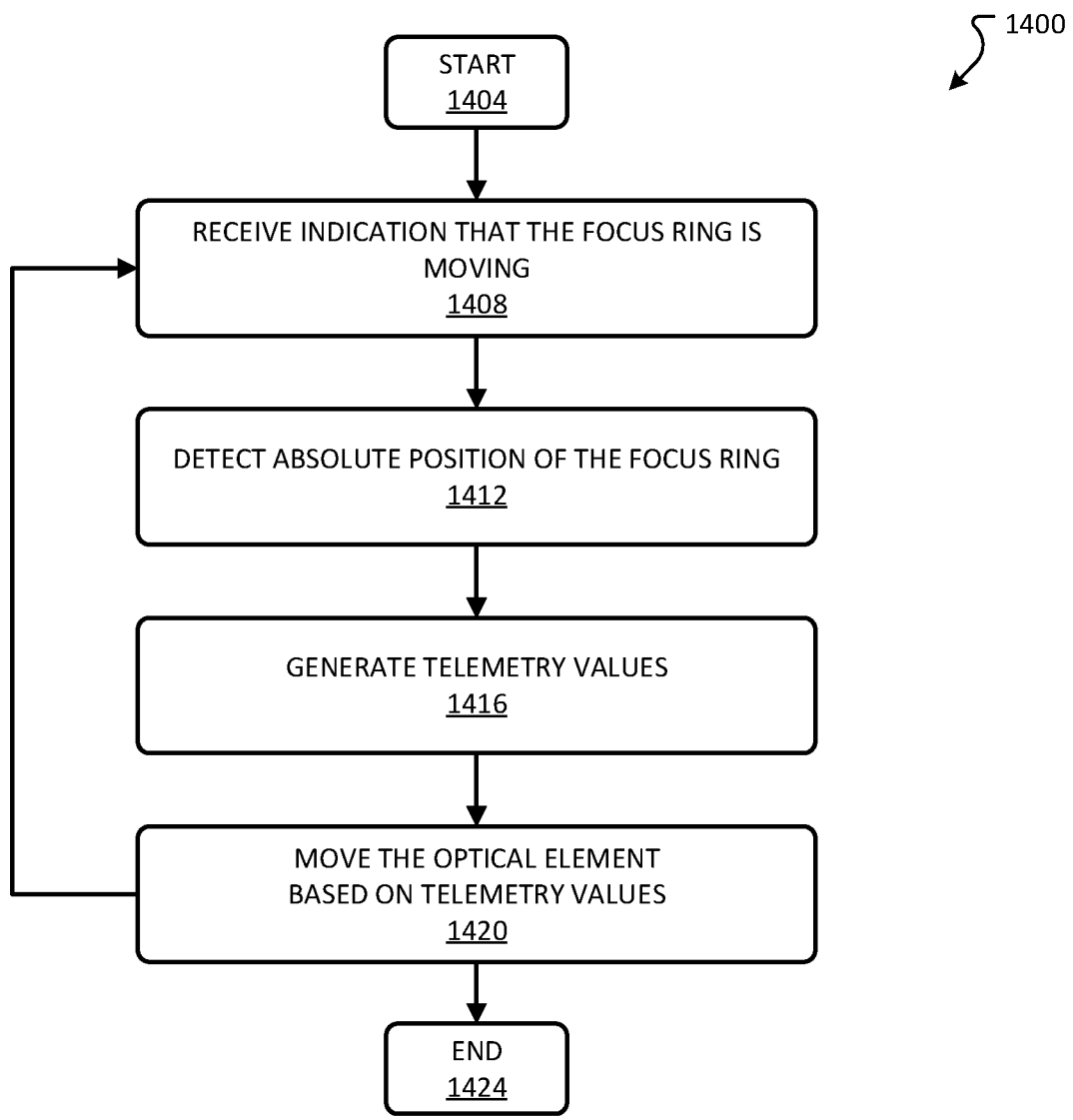
FIG. 14 depicts a first flow chart in accordance with examples of the present disclosure.

FIG. 14 depicts details of a method 1400 for moving an optical element in accordance with a coincidence adjustment in accordance with examples of the present disclosure. A general order for the steps of the method 1400 is shown in FIG. 14. Generally, the method 1400 starts at 1404 and ends at 1424. The method 1400 may include more or fewer steps or may arrange the order of the steps differently than those shown in FIG. 14. The method 1400 can be executed as a set of computer-executable instructions executed by a computer system and encoded or stored on a computer readable medium. Further, the method 1400 can be performed by gates or circuits associated with a processor, Application Specific Integrated Circuit (ASIC), a field programmable gate array (FPGA), a system on chip (SOC), or other hardware device. Hereinafter, the method 1400 shall be explained with reference to the systems, components, modules, software, data structures, user interfaces, etc. described in conjunction with FIGS. 1-13.

The method starts at 1404, where flow may proceed to 1408. At 1408, an indication that a focus ring, such as focus ring 408 (FIG. 4), is moving may be received at a processing device, such as the processing device 304 (FIG. 3). The indication that the focus ring 408 (FIG. 4) of a lens assembly 308 (FIG. 3) is moving may be measured and detected by the focus ring movement detection assembly 222 (FIG. 2)/304 (FIG. 3). Based on the information provided by the focus ring movement detection assembly 222 (FIG. 2)/304 (FIG. 3), the processing device 304 (FIG. 3) may detect an absolute position of the focus ring 408 at 1412. The processing device 304 (FIG. 3) may then generate one or more telemetry values at 1416 to be provided to the actuator 228 (FIG. 2)/318 (FIG. 3) to move the image displacement element 230 (FIG. 2)/320 (FIG. 3) at 1420. Steps 1408-1420 may repeat in accordance with a movement detection of the focus ring and/or based on one or more movement indications received from sensors 226 and 232.

Figure 15:
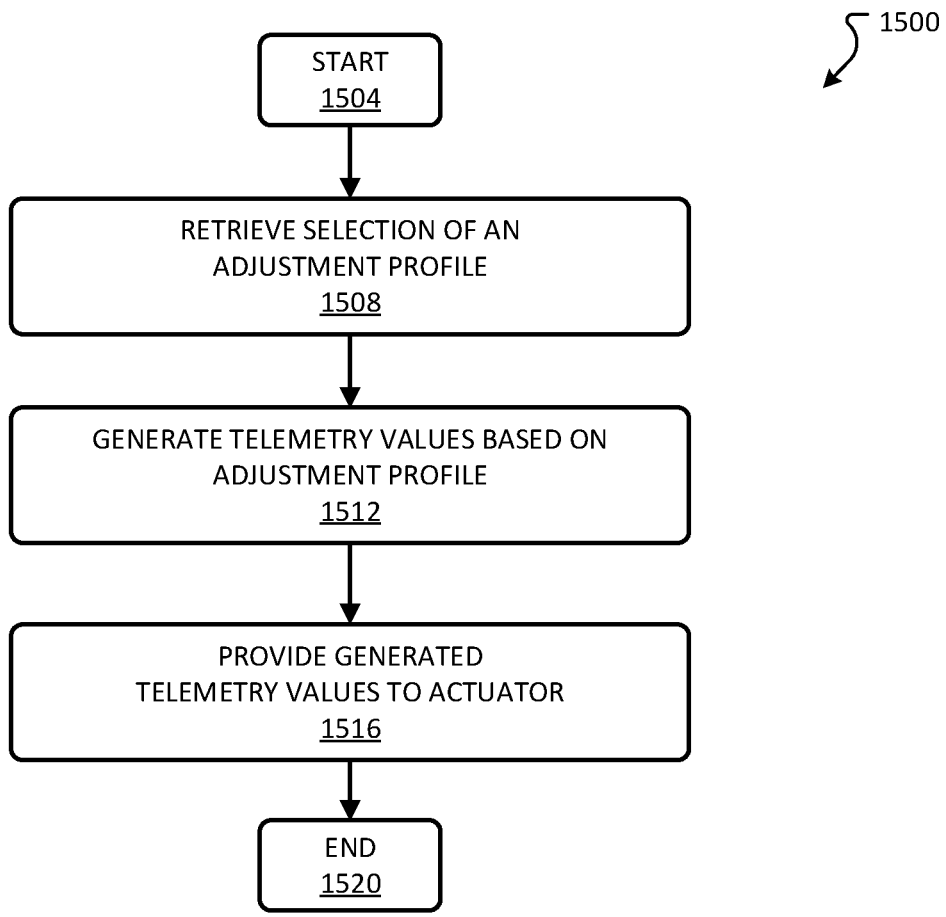
FIG. 15 depicts a second flow chart in accordance with examples of the present disclosure.

FIG. 15 depicts details of a method 1500 for selecting and utilizing an adjustment profile in accordance with examples of the present disclosure. A general order for the steps of the method 1500 is shown in FIG. 15. Generally, the method 1500 starts at 1504 and ends at 1520. The method 1500 may include more or fewer steps or may arrange the order of the steps differently than those shown in FIG. 15. The method 1500 can be executed as a set of computer-executable instructions executed by a computer system and encoded or stored on a computer readable medium. Further, the method 1500 can be performed by gates or circuits associated with a processor, Application Specific Integrated Circuit (ASIC), a field programmable gate array (FPGA), a system on chip (SOC), or other hardware device. Hereinafter, the method 1500 shall be explained with reference to the systems, components, modules, software, data structures, user interfaces, etc. described in conjunction with FIGS. 1-14.

The method starts at 1504, where flow may proceed to 1508. At 1508, an adjustment profile may be selected by a user. In some examples, the lens identification module 412 (FIG. 4) may provide an identification of lens group such that an adjustment profile is automatically selected. At 1512, telemetry values based on the adjustment profile may be provided to the actuator 228 (FIG. 2)/318 (FIG. 3). For example, an absolute position of the focus ring 408 (FIG. 4) may be detected and provided to the processing device 304 (FIG. 3). The processing device may generate an adjustment signal or movement amount to move the image displacement element 230 (FIG. 2)/320 (FIG. 3) based on the adjustment profile. At 1516, the generated telemetry values may be provided to the actuator 228.

Figure 16:
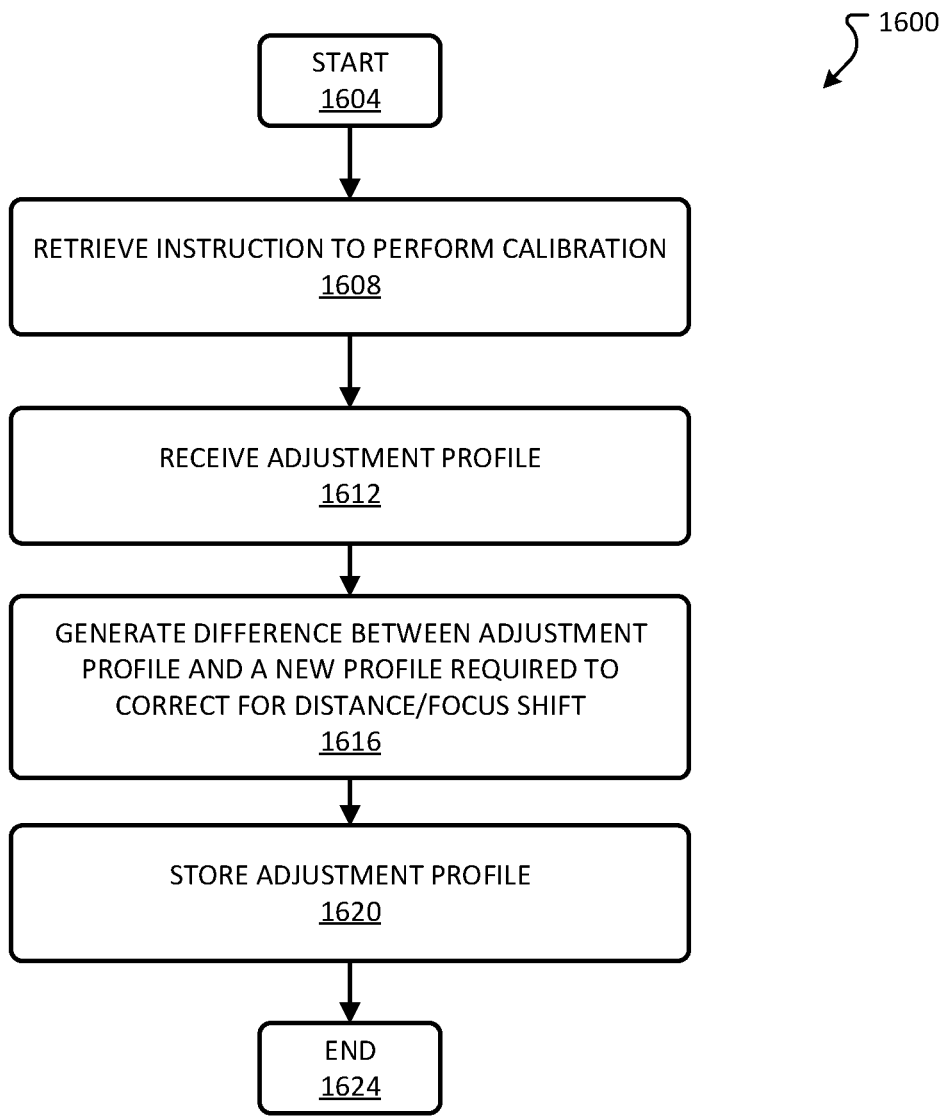
FIG. 16 depicts a third flow chart in accordance with examples of the present disclosure.

FIG. 16 depicts details of a method 1600 for calibrating or creating an adjustment profile in accordance with examples of the present disclosure. A general order for the steps of the method 1600 is shown in FIG. 16. Generally, the method 1600 starts at 1604 and ends at 1624. The method 1600 may include more or fewer steps or may arrange the order of the steps differently than those shown in FIG. 16. The method 1600 can be executed as a set of computer-executable instructions executed by a computer system and encoded or stored on a computer readable medium. Further, the method 1600 can be performed by gates or circuits associated with a processor, Application Specific Integrated Circuit (ASIC), a field programmable gate array (FPGA), a system on chip (SOC), or other hardware device. Hereinafter, the method 1600 shall be explained with reference to the systems, components, modules, software, data structures, user interfaces, etc. described in conjunction with FIGS. 1-15.

The method starts at 1604, where flow may proceed to 1608. At 1608, an instruction to perform a calibration process may be received. Accordingly, an adjustment profile may be retrieved, either selected by a user for example or selected by lens identification information from the lens identification module 412 (FIG. 4). At 1616, the processing device 304 (FIG. 3) may record lens position, as determined from the lens focus ring 408 (FIG. 4), into a storage area 322 (FIG. 3). The lens position information may be recorded for known distances and/or key-points. The processing device may then generate differences between the selected adjustment profile and a new profile required to correct from the distance/focus shift of the new optical group. In some examples, the processing device may interpolate remaining distance points and store or otherwise record the new positions into a new adjustment profile at 1620.

In some examples, to save energy, the rangefinder window may disappear. In some examples, this could be accomplished either with a mechanical spring, magnetic attraction, gravity, or some other method of making the window disappear. The purpose is to hide this window when the focus ring is not moving and when power is no longer applied to the system. Indeed, information of the focus may be provided to the operator when the operator is aiming but once the operator is finished, it is better for the operator to only have the frames to take a picture without the little centered window provided by the rangefinder. In some examples, when the focus ring changes position as detected by the sensor 226, the window may be displayed. When the sensor 226 does not detect a position change of the focus ring, the window may not be displayed and the actuator may be powered off.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Examples of the present disclosure are directed to a digital rangefinder camera comprising: a viewfinder assembly configured to receive a first optical image from a first optical path; focus ring movement detection assembly configured to detect an amount of movement associated with a focus ring of a lens attached to the digital rangefinder camera; and a processing device configured to provide a movement signal indicative of the amount of movement associated with the focus ring to an actuator coupled to an optical element, the actuator moving the optical element and displacing a second optical image from a second optical path directed toward an optical component in the viewfinder assembly, wherein the optical component in the viewfinder assembly is configured to project the first optical image and the second optical image toward a common viewing position when the first optical image and the second optical image coincide.

In accordance with at least one aspect of the above digital rangefinder camera, the processing device is configured to acquire an identifier associated with the lens attached to the digital rangefinder camera, obtain an adjustment profile based on the identifier, and provide the movement signal based on the adjustment profile. In accordance with at least one aspect of the above digital rangefinder camera, the actuator is at least one of a piezoelectric actuator or a magnetic actuator. In accordance with at least one aspect of the above digital rangefinder camera, the optical component is a beam splitter. In accordance with at least one aspect of the above digital rangefinder camera, the focus ring movement detection assembly includes a mechanical component in contact with the focus ring of the lens attached to the digital rangefinder camera and a sensor configured to monitor a characteristic of the mechanical component. In accordance with at least one aspect of the above digital rangefinder camera, the mechanical component is a pressure roller. In accordance with at least one aspect of the above digital rangefinder camera, the digital rangefinder camera further includes a frameline projection assembly configured to project framelines toward the optical component, the frameline projection assembly including a plurality of light-emitting diodes and a light diffusing material located between a printed circuit board and an etched stencil, the etched stencil including a plurality of etchings indicative of framelines. In accordance with at least one aspect of the above digital rangefinder camera, the frameline projection assembly includes an aperture such that the second optical path is configured to pass through the aperture. In accordance with at least one aspect of the above digital rangefinder camera, the digital rangefinder camera further includes a display projection device configured to project a display into the viewfinder assembly, the display projection device providing a third optical path such that the optical component in the viewfinder assembly is configured to project the first optical image, the second optical image, and the display toward the common viewing position. In accordance with at least one aspect of the above digital rangefinder camera, the digital rangefinder camera further includes a frameline projection assembly configured to project framelines toward the optical component. In accordance with at least one aspect of the above digital rangefinder camera, the display projection device includes an aperture such that the second optical path is configured to pass through the aperture. In accordance with at least one aspect of the above digital rangefinder camera, the display projection device is an organic light-emitting display device.

Examples of the present disclosure are directed to a digital rangefinder camera comprising a viewfinder assembly configured to receive a first optical image from a first optical path; a focus ring movement detection assembly configured to detect an amount of movement associated with a focus ring of a lens attached to the digital rangefinder camera; a processing device configured to provide a movement signal indicative of the amount of movement associated with the focus ring to an actuator coupled to an optical element, the actuator moving the optical element and displacing a second optical image from a second optical path directed toward an optical component in the viewfinder assembly; and a display projection device configured to project a display into the viewfinder assembly, the display projection device providing a third optical path such that the optical component in the viewfinder assembly is configured to project the first optical image, the second optical image, and the display toward a common viewing position.

In accordance with at least one aspect of the above digital rangefinder camera, the processing device is configured to acquire an identifier associated with the lens attached to the digital rangefinder camera, obtain an adjustment profile based on the identifier, and provide the movement signal based on the adjustment profile. In accordance with at least one aspect of the above digital rangefinder camera the focus ring movement detection assembly includes a mechanical component in contact with the focus ring of the lens attached to the digital rangefinder camera and a sensor configured to monitor a characteristic of the mechanical component. In accordance with at least one aspect of the above digital rangefinder camera the display projection device includes an aperture such that the second optical path is configured to pass through the aperture.

Examples of the present disclosure are directed to a method for obtaining a coincident image in a digital rangefinder camera. The method may include receiving a first optical image via a first optical path; receiving a second optical image via a second optical path; detecting an amount of movement associated with a focus ring of a lens attached to the digital rangefinder camera; providing a movement signal indicative of the amount of movement associated with the focus ring to an actuator coupled to an optical element; and displacing the optical element via the actuator such that the second optical image from the second optical path is displaced in a viewfinder assembly thereby causing the first optical image and the second optical image to coincide.

In accordance with at least one aspect of the above method, the method further includes projecting display information from a display projection device into the viewfinder assembly; and projecting the first optical image, the second optical image, and the display information toward a common viewing position. In accordance with at least one aspect of the above method, the method further includes passing the second optical path through an aperture in the display projection device. In accordance with at least one aspect of the above method, the method further includes acquiring an identifier associated with the lens attached to the digital rangefinder camera; obtaining an adjustment profile based on the identifier; and providing the movement signal based on the adjustment profile.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A digital rangefinder camera comprising:
    a viewfinder assembly configured to receive a first optical image from a first optical path;
    a focus ring movement detection assembly configured to detect an amount of movement associated with a focus ring of a lens attached to the digital rangefinder camera; and
    a processing device configured to provide a movement signal indicative of the amount of movement associated with the focus ring to an actuator coupled to an optical element, the actuator moving the optical element and displacing a second optical image from a second optical path directed toward an optical component in the viewfinder assembly,
    wherein the optical component in the viewfinder assembly is configured to project the first optical image and the second optical image toward a common viewing position when the first optical image and the second optical image coincide.

2. The digital rangefinder camera of claim 1, wherein the processing device is configured to acquire an identifier associated with the lens attached to the digital rangefinder camera, obtain an adjustment profile based on the identifier, and provide the movement signal based on the adjustment profile.

3. The digital rangefinder camera of claim 1, wherein the actuator is at least one of a piezoelectric actuator or a magnetic actuator.

4. The digital rangefinder camera of claim 1, wherein the optical component is a beam splitter.

5. The digital rangefinder camera of claim 1, wherein the focus ring movement detection assembly includes a mechanical component in contact with the focus ring of the lens attached to the digital rangefinder camera and a sensor configured to monitor a characteristic of the mechanical component.

6. The digital rangefinder camera of claim 5, wherein the mechanical component is a pressure roller.

7. The digital rangefinder camera of claim 1, further comprising:
    a frameline projection assembly configured to project framelines toward the optical component, the frameline projection assembly including a plurality of light-emitting diodes and a light diffusing material located between a printed circuit board and an etched stencil, the etched stencil including a plurality of etchings indicative of framelines.

8. The digital rangefinder camera of claim 7, wherein the frameline projection assembly includes an aperture such that the second optical path is configured to pass through the aperture.

9. The digital rangefinder camera of claim 1, further comprising a display projection device configured to project a display into the viewfinder assembly, the display projection device providing a third optical path such that the optical component in the viewfinder assembly is configured to project the first optical image, the second optical image, and the display toward the common viewing position.

10. The digital rangefinder camera of claim 9, further comprising a frameline projection assembly configured to project framelines toward the optical component.

11. The digital rangefinder camera of claim 9, wherein the display projection device includes an aperture such that the second optical path is configured to pass through the aperture.

12. The digital rangefinder camera of claim 9, wherein the display projection device is an organic light-emitting display device.

13. A digital rangefinder camera, comprising:
a viewfinder assembly configured to receive a first optical image from a first optical path;
a focus ring movement detection assembly configured to detect an amount of movement associated with a focus ring of a lens attached to the digital rangefinder camera;
a processing device configured to provide a movement signal indicative of the amount of movement associated with the focus ring to an actuator coupled to an optical element, the actuator moving the optical element and displacing a second optical image from a second optical path directed toward an optical component in the viewfinder assembly; and
a display projection device configured to project a display into the viewfinder assembly, the display projection device providing a third optical path such that the optical component in the viewfinder assembly is configured to project the first optical image, the second optical image, and the display toward a common viewing position.

14. The digital rangefinder camera of claim 13, wherein the processing device is configured to acquire an identifier associated with the lens attached to the digital rangefinder camera, obtain an adjustment profile based on the identifier, and provide the movement signal based on the adjustment profile.

15. The digital rangefinder camera of claim 14, wherein the focus ring movement detection assembly includes a mechanical component in contact with the focus ring of the lens attached to the digital rangefinder camera and a sensor configured to monitor a characteristic of the mechanical component.

16. The digital rangefinder camera of claim 15, wherein the display projection device includes an aperture such that the second optical path is configured to pass through the aperture.

17. A method for obtaining a coincident image in a digital rangefinder camera, the method comprising:
receiving a first optical image via a first optical path;
receiving a second optical image via a second optical path;
detecting an amount of movement associated with a focus ring of a lens attached to the digital rangefinder camera;
providing a movement signal indicative of the amount of movement associated with the focus ring to an actuator coupled to an optical element; and
displacing the optical element via the actuator such that the second optical image from the second optical path is displaced in a viewfinder assembly thereby causing the first optical image and the second optical image to coincide.

18. The method of claim 17, further comprising:
projecting display information from a display projection device into the viewfinder assembly; and
projecting the first optical image, the second optical image, and the display information toward a common viewing position.

19. The method of claim 18, further comprising:
passing the second optical path through an aperture in the display projection device.

20. The method of claim 19, further comprising:
acquiring an identifier associated with the lens attached to the digital rangefinder camera;
obtaining an adjustment profile based on the identifier; and
providing the movement signal based on the adjustment profile.

\* \* \* \* \*